No. 812,142. PATENTED FEB. 6, 1906.
E. E. KLEINSCHMIDT.
FACSIMILE TELEGRAPH.
APPLICATION FILED JAN. 18, 1901.
10 SHEETS—SHEET 1.
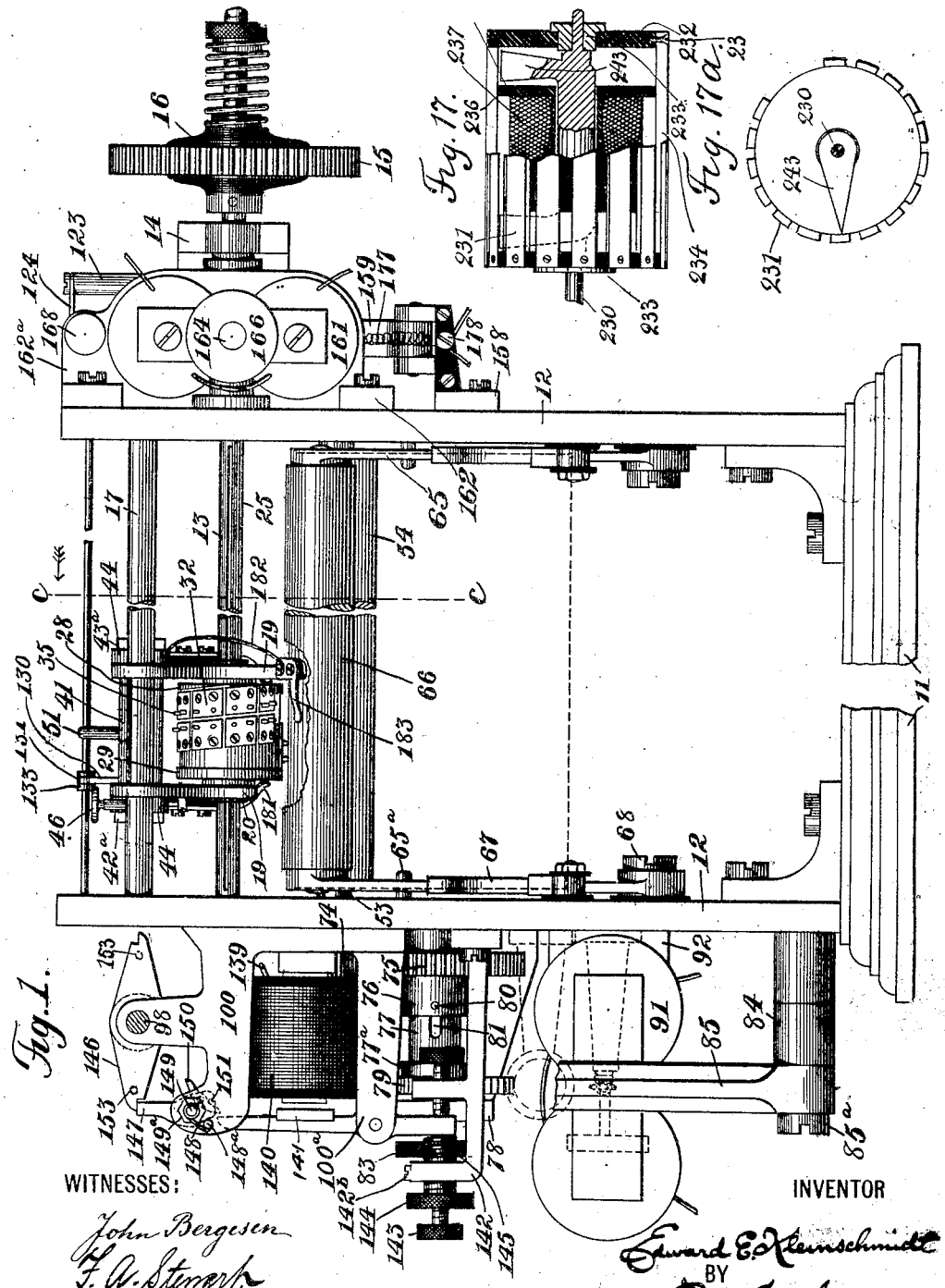
WITNESSES:
John Bergesen
F. A. Stewart
INVENTOR
Edward E. Kleinschmidt
BY
Edgar Tate
ATTORNEYS

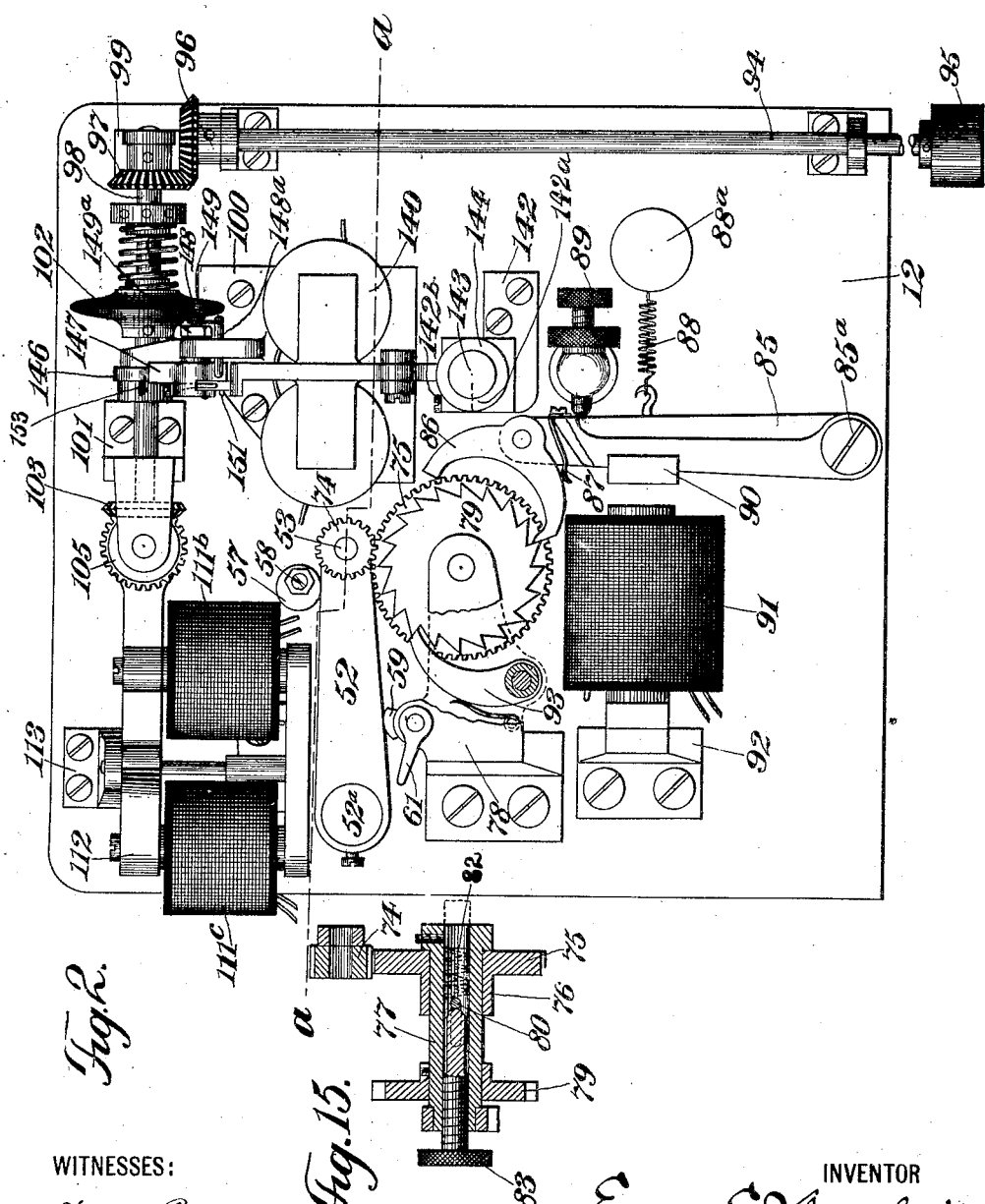

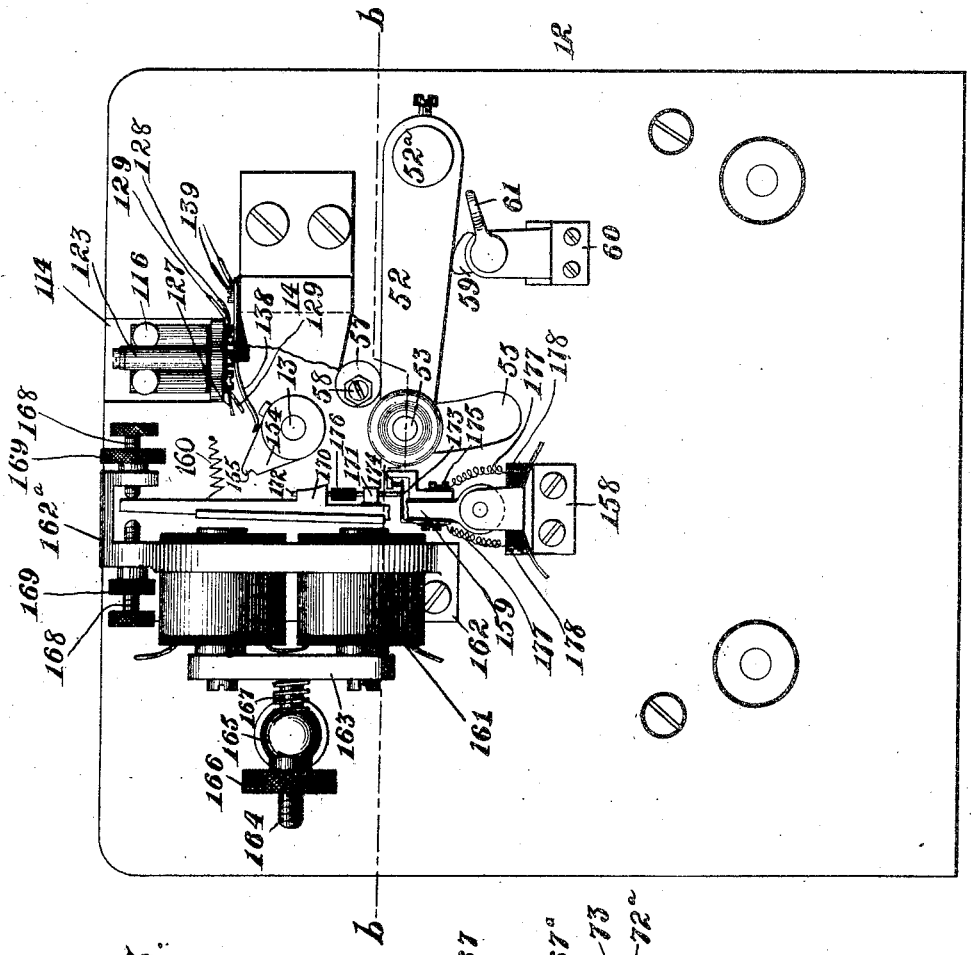

No. 812,142. PATENTED FEB. 6, 1906.
E. E. KLEINSCHMIDT.
FACSIMILE TELEGRAPH.
APPLICATION FILED JAN. 18, 1901.
10 SHEETS—SHEET 4.
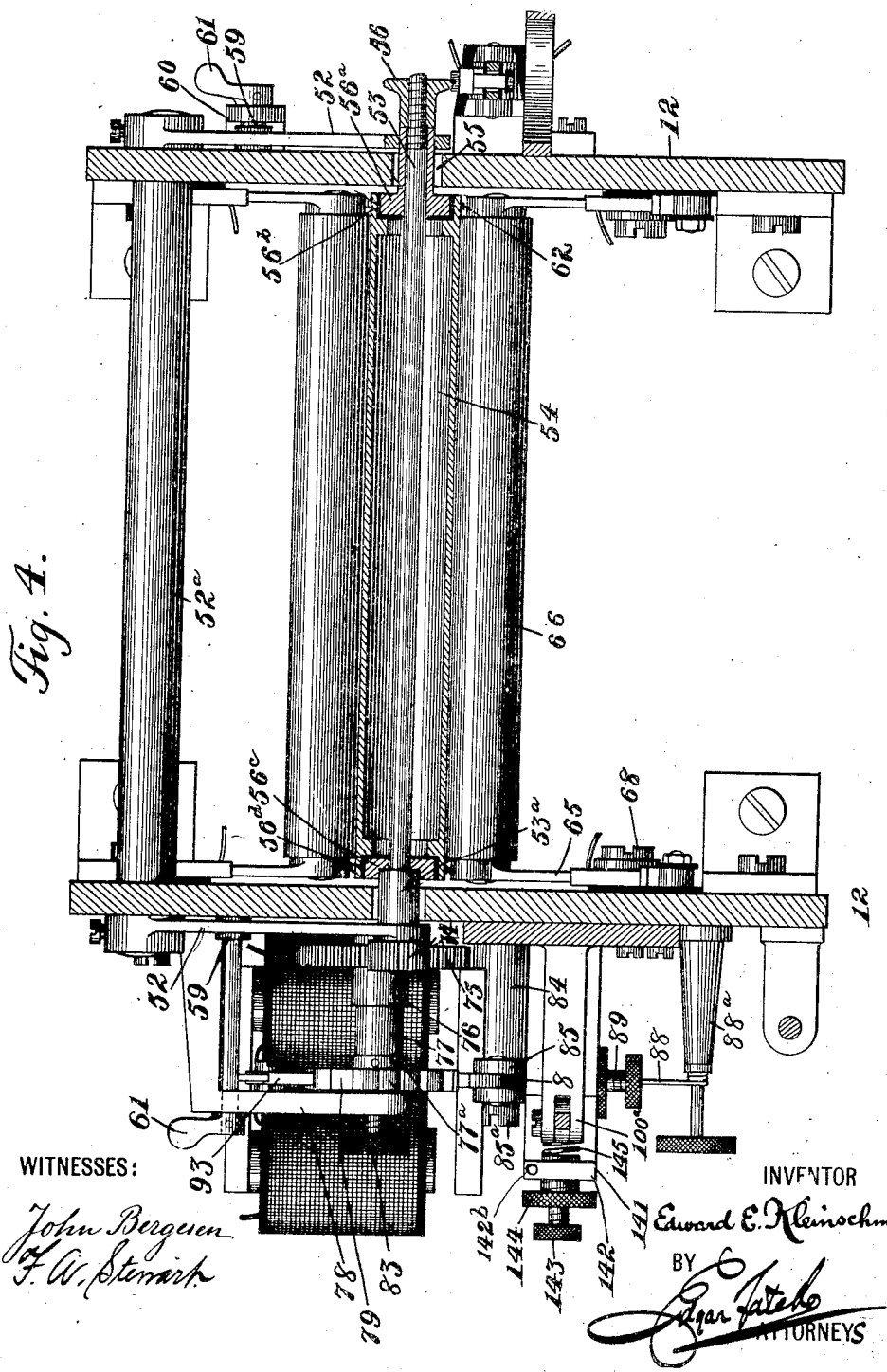

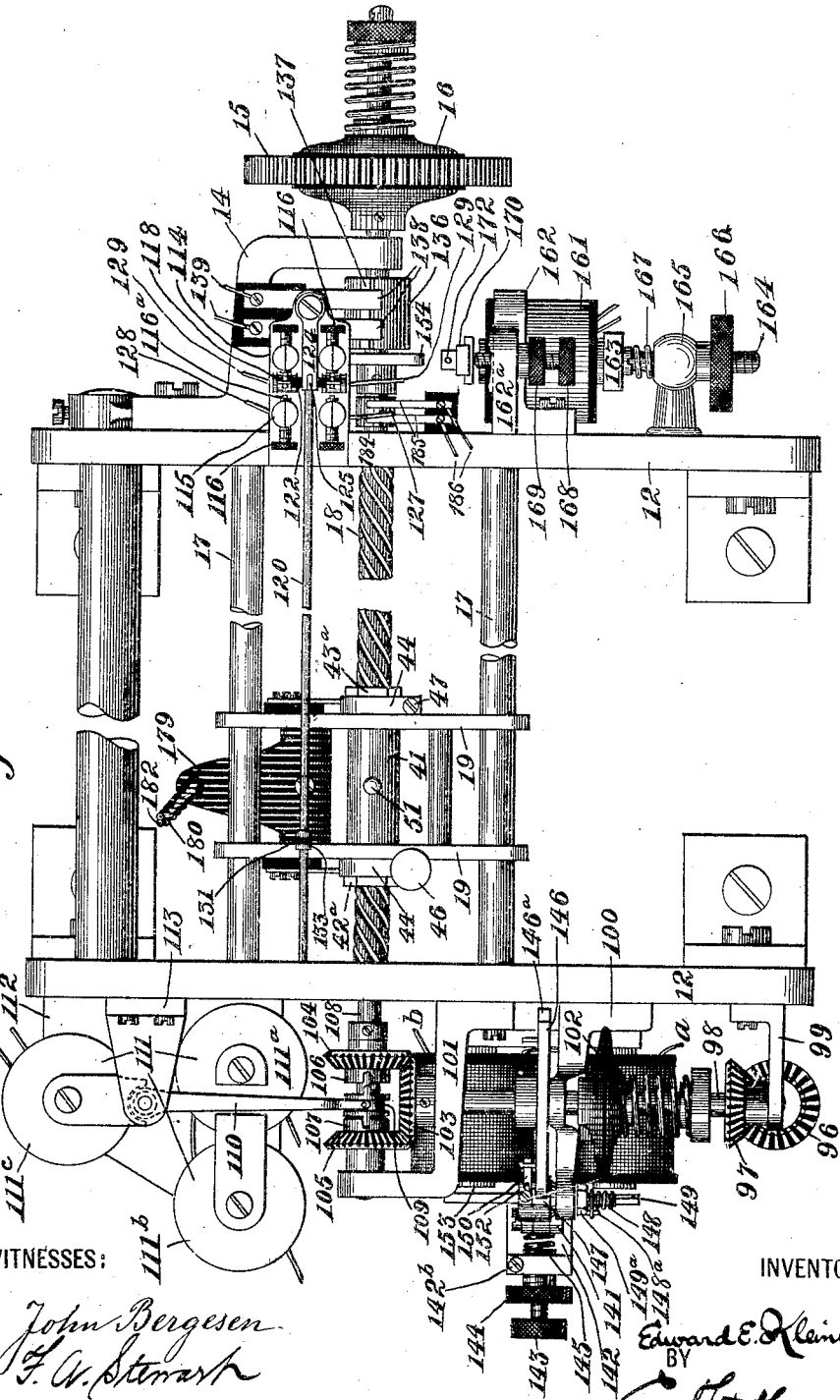

No. 812,142.
PATENTED FEB. 6, 1906.
E. E. KLEINSCHMIDT.
FACSIMILE TELEGRAPH.
APPLICATION FILED JAN. 18, 1901.
10 SHEETS—SHEET 6.
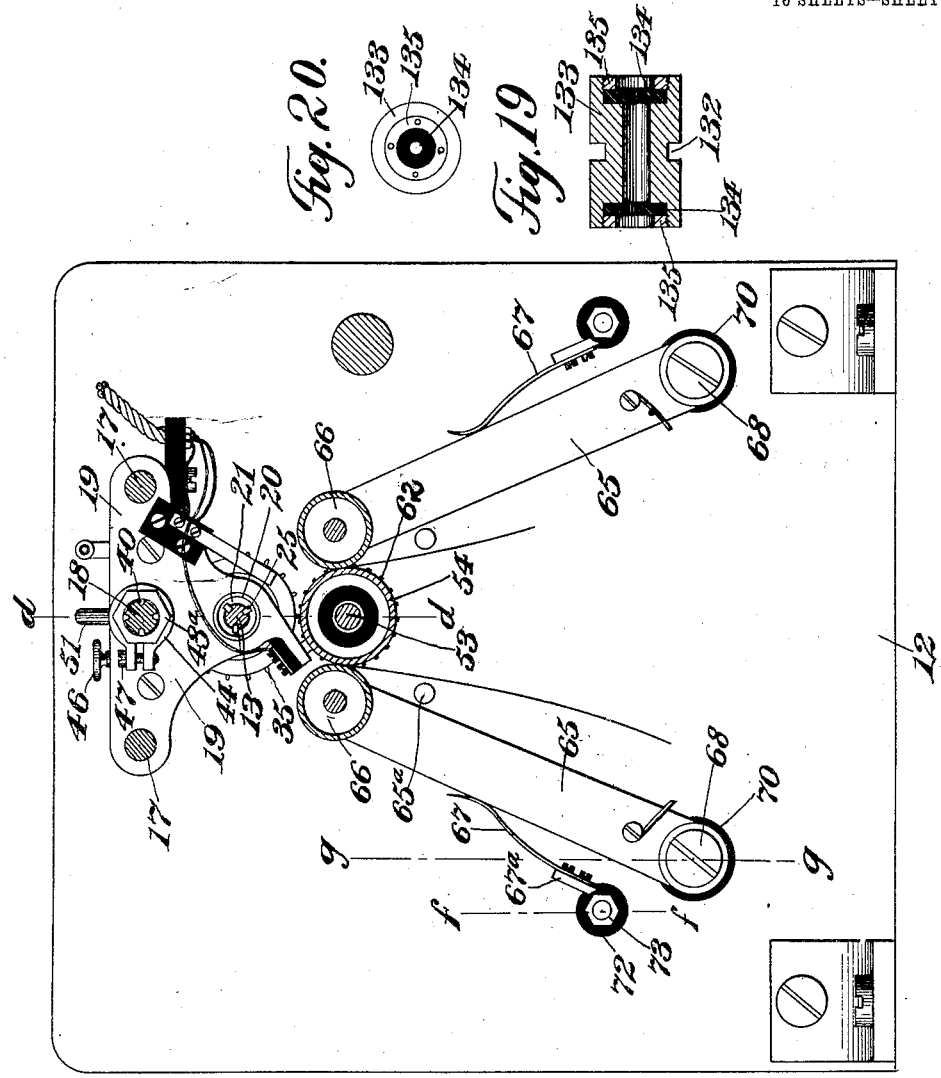
WITNESSES:
John Bergesen
F. A. Stewart
INVENTOR
Edward E. Kleinschmidt
BY
Edgar Tate
ATTORNEYS

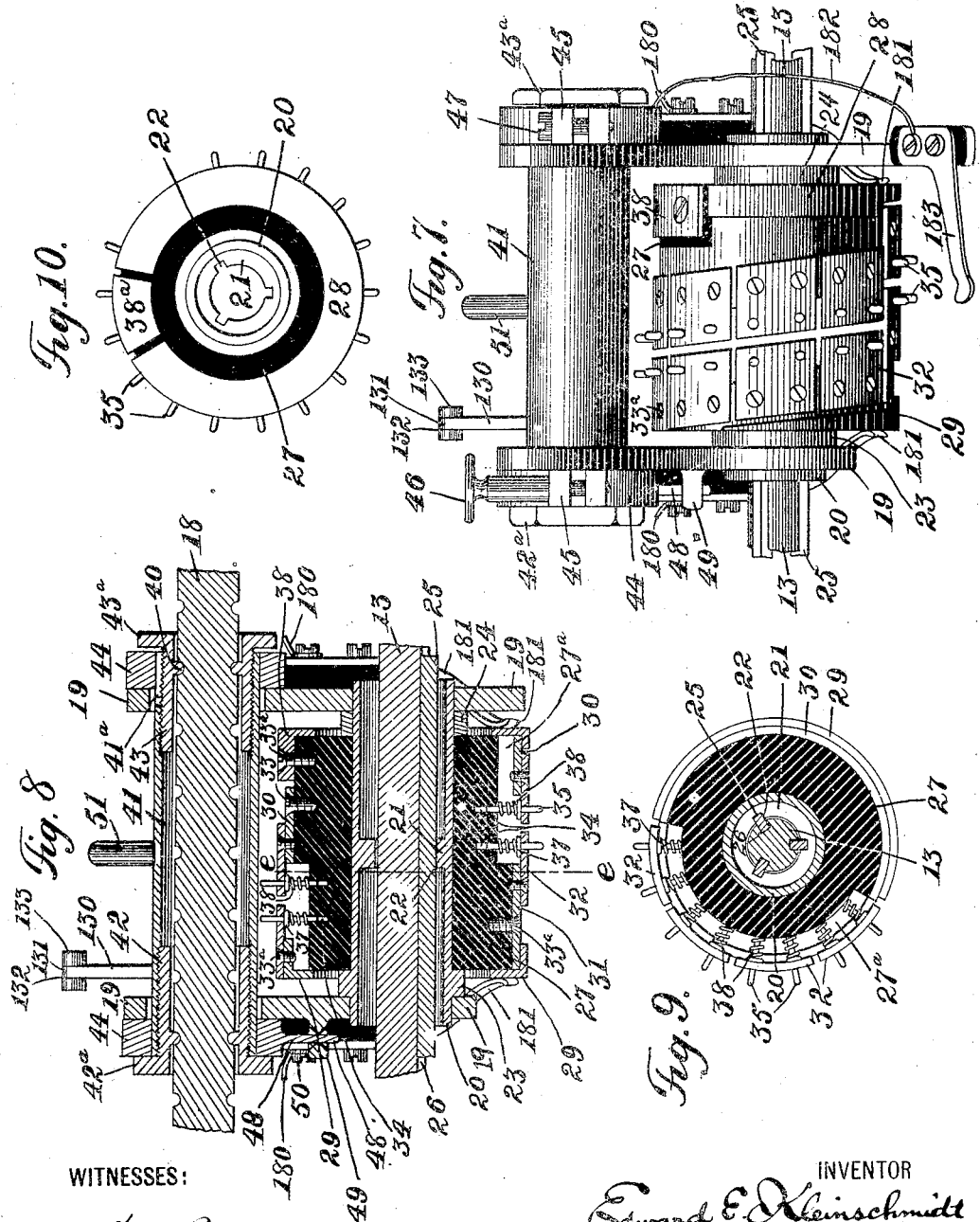

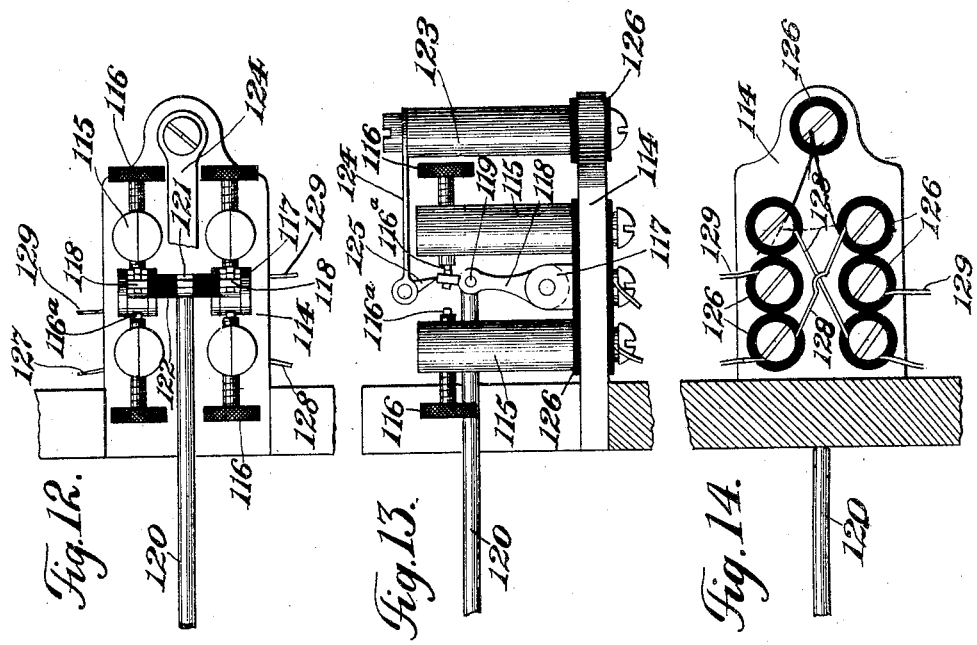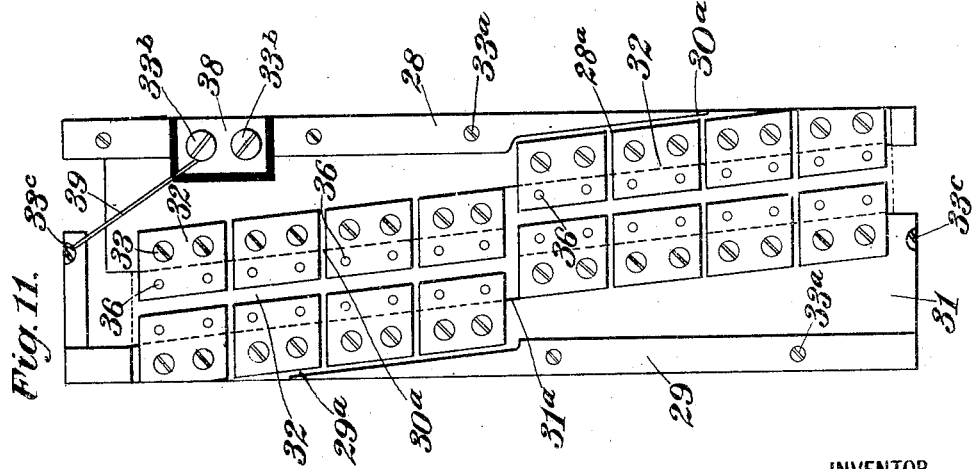

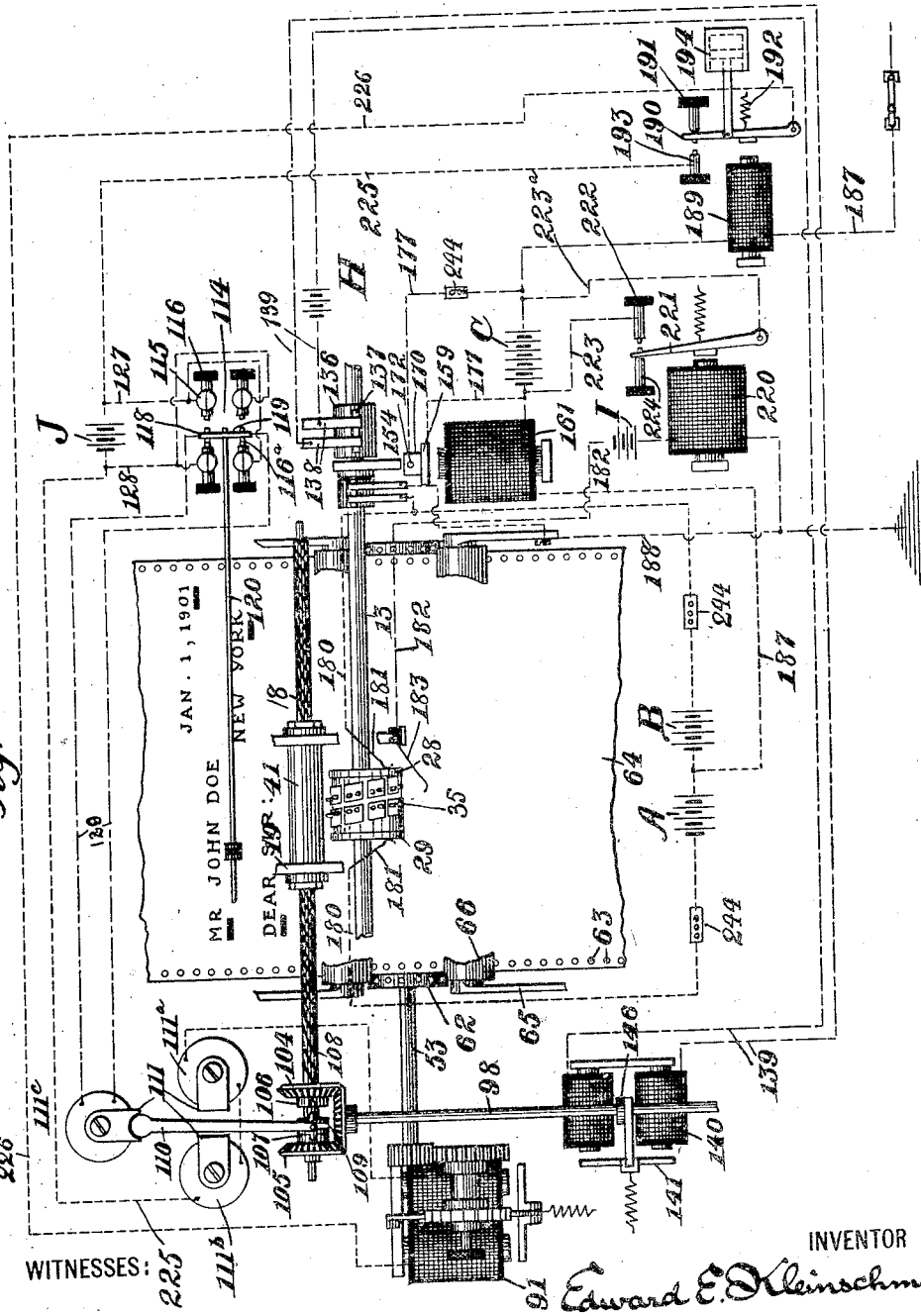

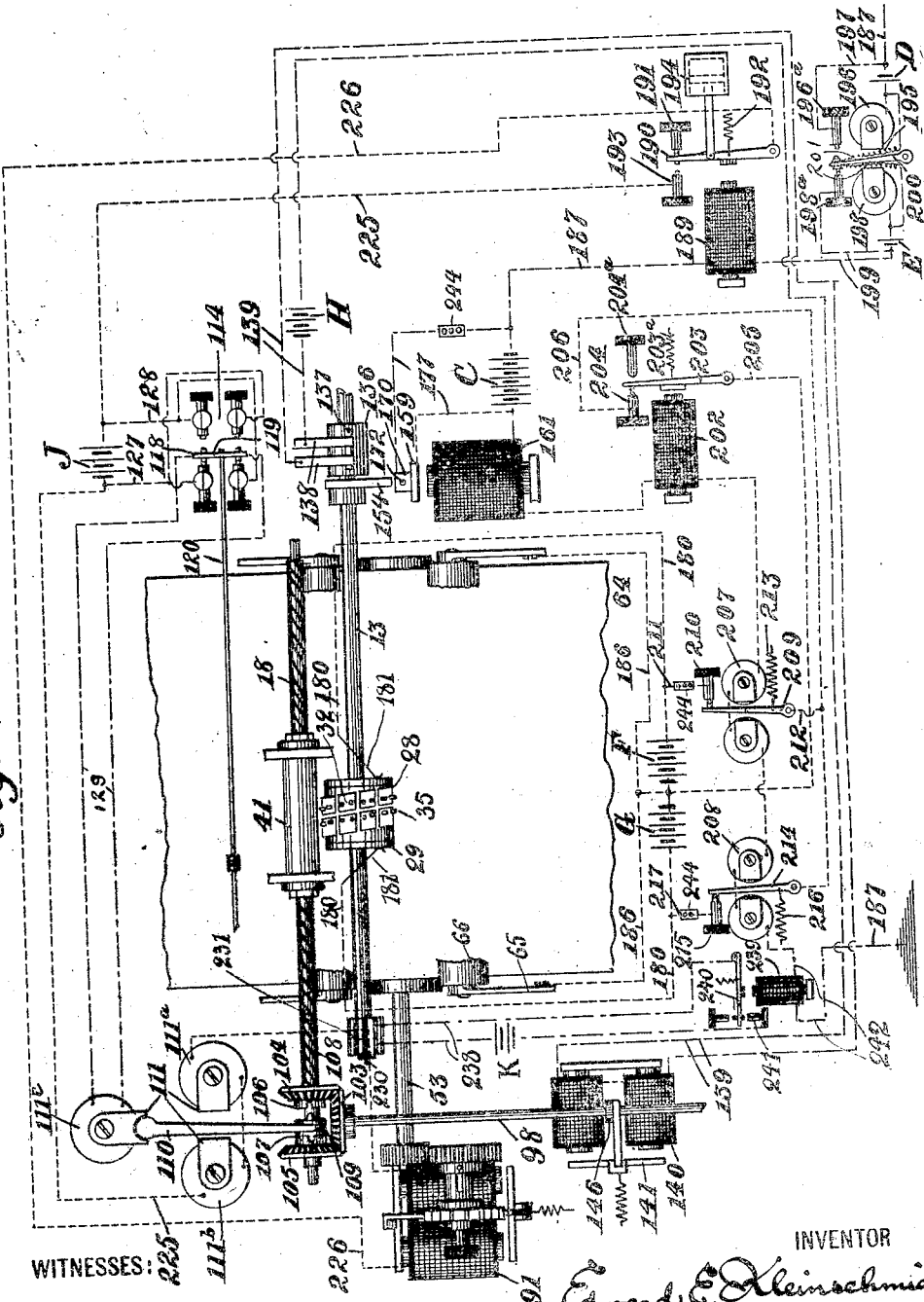

UNITED STATES PATENT OFFICE.

EDWARD E. KLEINSCHMIDT, OF NEW YORK, N. Y., ASSIGNOR TO FREDERICK KLEINSCHMIDT, OF NEW YORK, N. Y.

FACSIMILE-TELEGRAPH.

No. 812,142.  Specification of Letters Patent.  Patented Feb. 6, 1906.

Application filed January 18, 1901. Serial No. 43,754.

*To all whom it may concern:*

Be it known that I, EDWARD E. KLEINSCHMIDT, a citizen of the United States, residing at New York, in the county of New York and State of New York, have invented certain new and useful Improvements in Facsimile-Telegraphs, of which the following is a full and complete specification, such as will enable those skilled in the art to which it appertains to make and use the same.

This invention relates to that class of telegraphic mechanism or apparatus which is generally known by the term "facsimile-telegraph" and which is designed for the transmission in facsimile of manuscript messages or other matter which is written upon a sending blank or sheet.

My invention has particular relation to facsimile-telegraphs for sending in facsimile printed or type-written matter, though it may be more or less capable of transmitting pictures, handwriting, or other continuous matter, and particularly many of the novel features of the invention are applicable to facsimile-telegraphs for the transmission of all such matter.

The class of facsimile-telegraph to which my invention belongs embodies in the transmitting machine or apparatus a stylus mechanism, which contacts with a metal foil-sheet whereon the matter to be transmitted is written or drawn with an insulating-ink. The contact of the stylus device with the said insulated portions is arranged and adapted to send an impulse over the line and cause a corresponding actuation of a stylus device comprised in the receiving machine or apparatus, whereby the recording-stylus mechanism will operate to record in facsimile the matter thus transmitted. Hitherto in apparatus of this character it has been necessary to maintain a perfect synchronism between the transmitting and receiving mechanisms, since otherwise the stylus devices would not travel in perfect unison, and the result of failure of correspondence of movement of the recording-stylus with the movement of the transmitting-stylus would manifestly result in confusing the matter received and cause it to be anything but a facsimile of the original message. Various means for synchronizing such apparatus have been employed, and reference may be made in this connection to my Letters Patent of the United States, respectively, No. 709,158, September 16, 1902, and No. 721,202, February 24, 1903.

The object of my present invention is to produce a facsimile-telegraph which can be operated without a constant synchronism and which will perfectly transmit a printed or type-written message, such as the facsimile of a printed page of a book or a type-written letter. In my present invention I transmit a certain specific portion of the message which is legibly distinct, and therefore practically isolated from the rest of the message—as, for example, one, two, four, or more separate letters of the printed page or type-written message—and after the transmission of each such letter or predetermined number of letters or specific part of the message I stop the machines and start them again in unison. If the machines are run at substantially the same rate of speed as nearly as this can be accomplished by the usual mechanical means, there will not be in the travel of the styluses over the one or mo specific letters (in the manner and by the devices forming my invention, as hereinabove described) such lack of synchronism as would produce noticeable effects with respect to the legibility of the message. I therefore in this form of machine dispense with the maintenance of synchronism as a necessity of operation.

As applied to the transmission of printed or type-written messages or other matter capable of being, as it were, divided up into practically isolated portions, it is an important object of my invention t enable the peculiarly rapid transmission of such messages. The speed of transmission attained by the Morse dot-and-dash system is remarkably low and that of printing-telegraphs not very much greater. It is the purpose and the result of my invention to attain a very considerable speed, and this in addition to the sending of the message not only in legible form, thereby saving time, but also in facsimile, thereby insuring accuracy and likewise accomplishing all of the advantages admittedly attendant upon facsimile transmission.

With these ends in view my invention consists in the facsimile-telegraph apparatus and the specific features of construction and arrangement thereof, hereinafter fully described and claimed.

In the accompanying drawings, forming a part of this specification, in which like characters of reference denote corresponding parts in the several views, Figure 1 is a front elevation of the transmitting apparatus forming part of my invention, certain of the parts being broken away or removed in the interest of clearness. Fig. 2 is an elevation of one side of the machine. Fig. 3 is a similar elevation of the opposite side of the machine, the operating-gear of the stylus-carrier shaft being removed and a portion of its support broken away. Fig. 4 is a sectional plan view taken on the line $a\ a$ of Fig. 2, the upper portion of the machine being removed and the lower portion shown in this figure. Fig. 5 is a sectional plan of the upper portion of the mechanism, taken on the line $b\ b$ of Fig. 3, the portion below said line not being shown. Fig. 6 is a vertical section taken on the line $c\ c$ of Fig. 1. Fig. 7 is an enlarged front elevation of the transmitting-stylus carrier mechanism. Fig. 8 is a sectional view of the same, taken upon the line $d\ d$ of Fig. 6. Fig. 9 is a section taken on the line $e\ e$ of Fig. 8. Fig. 10 is a side elevation of one side of the stylus-carrier alone. Fig. 11 is a diagrammatic plan or "lay-out" of the surface of the stylus-carrier. Fig. 12 is an enlarged plan view of the current-reversing contacts shown in Fig. 5. Fig. 13 is a side elevation of the same. Fig. 14 is an inverted plan view thereof. Fig. 15, Sheet 2, is a section of a portion of the paper-feed mechanism. Fig. 16, Sheet 3, is a detail of one of the springs for actuating the pressure-rollers of the paper-feeds, being a section taken on the line $ff$ of Fig. 6. Figs. 17 and 17$^a$, Sheet 1, are details of a governor or synchronizer used upon the recording-machine. Fig. 18, Sheet 6, is a similar section taken on the line $g\ g$ of Fig. 6, showing one of the arms or levers which carry the said pressure-rollers. Figs. 19 and 20 are respectively a central vertical section and an elevation of the frictional tube which actuates the reversing-contacts shown in Figs. 1 and 5. Fig. 21 is a diagram of the transmitting-machine and circuits. Fig. 22 is a similar diagram of the recording-machine and circuits.

Referring to the drawings, 11 designates a suitable framework, which may be of any desired construction and which, as shown, embodies a base or bed plate with substantially rectangular side plates 12 bolted thereto. Toward the top of the framework there extends between the side plates 12 a horizontal shaft 13, which is journaled in the said side plates and projects beyond the framework at one side, (in the drawings the right-hand side,) where it passes through and is supported by a bracket 14, having mounted upon its outer end a gear-wheel 15, operatively connected thereto by frictional clutch devices 16 of any approved pattern.

Throughout the specification I shall have occasion to use the words "right" and "left" for the sake of clearness and ready reference to the drawings, and I shall designate as the "left" of the machine or drawings the portion thereof nearest to the signature end of the sheet and as the "right" the portion adjacent to the upper or title end of the sheet.

The shaft 13 is revolved by any suitable power applied to the gear 15. This in practice will be accomplished by a suitable electric motor, and motors of like capacity operating at like speeds will be employed for the transmitting and recording machines.

Above and somewhat to either side of the shaft 13 are mounted two guide-rods 17, and immediately above the said shaft is mounted a worm or spirally-grooved shaft 18. The shaft 13 and the guide-rods 17 constitute the supports of the stylus-carrier and its frame, which are longitudinally movable upon all of these shafts and rods. The frame of the stylus-carrier comprises, primarily, two approximately triangular plates 19, an elevation of which is seen in Fig. 6. The upper portions of the plates are apertured at either end thereof to permit the passage therethrough of the guide-rods 17, with which the said plates are in direct contact. The lower ends of the triangular plates are apertured to receive therein a tube 20, which is provided centrally with an integral flange or bushing 21, formed with a plurality of grooves 22, extending across the inner face thereof. The tube 20 is provided near one end with an exterior annular flange 23, which may be integral therewith and which abuts against one of the plates 19, (in the drawings the left-hand plate,) and upon the opposite end of the tube 20 is mounted a collar 24 of similar form to the flange 23 and secured upon the said tube permanently in any desired manner and abutting against the inner face of the opposite plate 19, (in the drawings the right-hand plate.)

The shaft 13 passes through the tube 20, and the said tube is operatively connected therewith by means of a plurality of splines 25, which are inserted in longitudinal grooves 26 in the said shaft and which project into the grooves or notches 22 of the bushing or flange 21. The said tube 20 consequently revolves with the shaft 13 and forms the hub of the stylus-carrier. Upon the outside of the tube or hub 20 is secured a tubular and cylindrical block 27 of insulating material, which may be and is preferably hard rubber. This block may be secured by shrinking the same upon the tube or hub 20. The block is cut out upon its periphery to form two segmental grooves 27$^a$ and is covered or surrounded by a casing through which the styluses are adapted to project. This casing is made in sections for the purpose of separating or insulating the styluses in sets, as will be hereinafter fully described, the number and forms of which sections are best shown in Figs. 8 and 11. Upon either end of the cylindrical block are secured rings or collars 28 and 29, which are open or apertured centrally, the opening being of sufficient diameter to prevent contact of said collars with the flange 23 and the collar 24 of the tube or hub 20. Beneath the right-hand collar 28 is secured a strip 30, the form of which may be seen in Fig. 11. One end of this strip projects from the right-hand edge of the block 27 to a point slightly beyond the center thereof, and the inner edge 30$^a$ of the said strip ranges diagonally or tapers outwardly for about half its length, then turns outwardly at an approximate right angle, so as greatly to decrease the width of the said strip, and from thence the said edge 30$^a$ tapers gradually to the opposite end of the strip, this zigzag edge of the strip being indicated in dotted lines in Fig. 11. Beneath the left-hand collar 29 is a similar strip 31, which is formed with a like zigzag edge 31$^a$; but this strip tapers in a direction opposite to the strip 30, whereby there will be formed between the two strips a zigzag space or aperture which will extend around the block 27 in the direction of a spiral turn. In practice the casing may be advantageously formed by suitably slotting or cutting out a tube of metal to form the two strips. Upon and in a line corresponding to the edge of the said strips 30 and 31 I secure plates 32, secured by screws 33. These plates are sixteen in number, as shown in Fig. 11, and have the form of parallelograms, and their free edges project beyond the zigzag edges 30$^a$ and 31$^a$, respectively, to range parallel with the tapered portions thereof, whereby the said edges of the plates approach toward but do not come in contact with the free edges of the plates of the opposite strip. Thus eight of the plates are secured upon each strip and the flanged collars 28 and 29 are cut out at 28$^a$ and 29$^a$ to permit all of the plates to lie directly upon the strips 30 and 31, whereby each series of plates are electrically connected through the strip. The screws 33, which secure the plates to the strips 30 and 31, are also driven into the cylindrical block 27, whereby to secure the said plates and the said strips to the block, and the collars 28 and 29 are also secured to the said block by screws 33$^a$, driven through the flanged portions thereof. The screws 33$^a$, which lie over the cut-out or recessed portion of the block 27, are shortened, as shown in Fig. 8, and do not extend into the block, there being in general no need for the entrance of so great a number of screws into the block, though this is optional. It will now readily be seen that the projecting portions of the plates 32 lie over the groove or recess 27$^a$ of the block. Immediately beneath this groove there are formed in the block 32 radial holes 34, adapted to receive a corresponding number of styluses 35, the outer ends of which extend through apertures 36, which are formed in the plates 32 in line with the slots 34 of the block. Immediately beneath the plates 32 the styluses are provided with annular shoulders 37, which limit the outward movement of the stylus, and between the said shoulders and the block the styluses are surrounded by spiral springs 38, tending to maintain them normally projected. The strips 28 and 29 are out of contact not only peripherally in virtue of the space or aperture between their respective zigzag edges, but, further, are separated at the point or transverse line of the block, where the wide ends of the strips are juxtaposed. By reason of this and of their attachment upon the insulating-block 27 and of the absence of connection of the collars 28 and 29 with the flange 23 and collar 24 of the tube or hub 20 these strips 30 and 31 and their respective plates will be insulated both from each other and from the remainder of the machine, and the respective plates 32 and styluses 35, carried by each of the said strips, will be similarly insulated from those carried by the opposite strip. For a purpose which will hereinafter appear I cut out a short section 38$^a$ of the collar 28 and decreasing its dimensions somewhat and secure it separately to the block 27 by means of screws 33$^b$, whereby it forms a contact-plate, and one of the screws 33$^b$ I connect by a short wire 39 with another screw 33$^c$, inserted in the nearest adjacent portion of the strip 31.

Loosely surrounding the worm 18 is a tube or sleeve 41, the ends of which pass loosely through the plates 19 of the stylus-carrier frame beneath and centrally of their upper edges. The ends of this sleeve are interiorly threaded to receive therein nuts 42 and 43, the bores of which are provided with four inwardly-projecting pins or lugs 40, which enter the grooves of the worm 18, and the said nuts are provided with polygonal heads or flanges 42$^a$ and 43$^a$, by which they are turned. The ends of the sleeve 41 are longitudinally slitted at 41$^a$, as shown in Fig. 8, and are surrounded by collars or rings 44, the open ends of which are provided with lugs or bearings 45 to receive therein, respectively, the thumb-screw 46 and the set-screw 47. The left-hand collar, which is operated by the thumb-screw 46, is provided with a finger 48, projected beneath the same and entering an apertured extension or boss 49, the aperture 50 of which is outwardly flared, as shown in Fig. 8, whereby to permit slight lateral movement of the finger 48 in the extension 49. The object of this construction is to prevent the sleeve 41 from turning after the screws 46 and 47 have been set. It will be observed that I have shown the right-hand nut 43 slightly projected, leaving a further space for inward movement of the said nut, whereby to adjust the distance between the two nuts in order to make the movement thereof upon the worm-shaft 18 free and yet sufficiently tight. When it is desired so to adjust the device, the set-screw 47 is loosened, and after the nut is manipulated as desired this set-screw is tightened, and in this operation the opposite nut and its attachment are not disturbed. Upon the center of the sleeve 41 I have shown a stud 51, which is adapted to turn the sleeve 41 in order to regulate the position of the stylus-carrier upon the said worm 18 and upon the shaft 13, as may be required in the operation of the telegraph apparatus, as hereinafter described. By moving this stud 51 forwardly or rearwardly the stylus-carrier will be moved to the right or to the left, and when it is desired to adjust the device in this manner the thumb-screw 46 is loosened, the sleeve 41 turned the required amount, and the said thumb-screw 46 again tightened. As the finger 48 prevents revolution of the collar 44, to which it is attached, the sleeve 41 cannot be further turned, and in this operation of adjustment as there is nothing to prevent turning of the right-hand collar 44 the latter need not be disturbed.

Upon the outer faces of the plates 12 (see Fig. 2) I mount levers 52, pivoted through their rear ends by means of a shaft 52ª and extending forwardly to approximately the center of the machine or immediately below the stylus-carrier. The free ends of the levers have journaled therein the shaft 53 of the paper-feed roller or platen 54, which extends longitudinally between the plates 12 and passes through vertically-disposed segmental slots 55 in the said plate, whereby to permit vertical movement and adjustment of the roller relatively to the styluses, and the right-hand end of the shaft is threaded and provided with a nut 56, beneath which is secured a tubular plug or head 56ª, which is fitted in the end of the roller 54 with intervening insulating 56ᵇ, which nut tightens the roller on its shaft. On the other end of the shaft 53 is secured a disk 56ᶜ with intervening insulating 56ᵈ, which is held in place by a shoulder 53ª upon the left-hand end of the shaft. Immediately above the levers 52 are mounted in the plates 12 cams 57, which, as shown, are circular in contour and are eccentrically placed upon set-screws 58, which enter the plates 12. These cams bear upon the upper edges of the levers and are adjusted and set in such position as to limit the upward movement of the roller beyond the desired distance of its face from the styluses. Beneath the levers and somewhat rearwardly are mounted cams 59, one of which is pivoted in a plate 60, secured to the right-hand-side plate 12 of the machine, the other being mounted in a bracket upon the left-hand plate, which will hereinafter be described.

These cams are operated by thumb-levers 61, which may be turned to force the levers 52 rigidly against the cams 57, thus raising and sustaining the paper-feed roller in position, or may be oppositely turned to drop the roller out of contact with the styluses. It will be understood that the cams 57 are always set and rarely require adjustment, while the cams 59 are actuated to manipulate the roller.

At either end of the paper-feed roller 54 are secured a circumferential series or ring of pins or projections 62, which enter corresponding apertures 63, formed on the sides of the message-blank 64, which passes over the roller from the front of the machine to the rear thereof. The message-blank may be either a separate sheet of paper of a size merely to receive one message or it may be comprised in a continuous strip fed from a suitable supply-roller. The blank is formed of metal-foil paper and the message matter is written, printed, or otherwise marked thereon with insulating-ink, which insulated markings break the contact of the styluses with the foil-paper, as hereinafter described, and the object of the feed-roller pins and message-blank perforations is to cause the blank to present to the styluses at starting exactly a line of the message and to present successive lines thereto with perfect uniformity.

Upon the inside of the plates 12, near the front and the rear, are pivoted the vertically-disposed levers 65, which swing from their lower ends and carry upon their upper ends pressure-rollers 66, which bear against the face of the paper-feed roller at either side thereof to maintain the message-blank in position and impart a constant tension to the uppermost portion thereof with which the styluses are contacting, and these rollers 66 are pressed inwardly against the paper-feed roller by plate-springs 67, bearing upon the outer edges of the levers 65, the inward movement of which is limited by studs 65ª upon the plates 12. The levers 65 are pivoted to the plates 12 by means of screws 68, which enter threaded plugs or nuts 69, which are set in the plates and are formed with dovetailed shoulders 69ª, countersunk or socketed in the plates from the outside, and between the said nuts and the sockets of the plates in which they rest are linings of insulating material 70, which are flanged to insulate the ends of the levers as well as the nuts from the plates. This detail is shown in Fig. 18, and in Fig. 16 will be seen a similarly-purposed means of attachment of the springs 67, which comprises screws 71, countersunk in the plates 12, with surrounding flanged lining 72 and nuts 73, mounted upon the inner ends of the screws, which pass through the plates 67ª of the springs, the said nuts being underlaid with insulating washers 72ª. This and other means of insulation of the directly-operating parts of the transmitting and recording mechanism from the remainder of the machine I consider to be operatively necessary.

The left-hand end of the shaft of the paper-feed roller is provided outside of the lever 52 with a pinion 74, which meshes with a spur-gear 75, the hub 76 of which is slidably mounted upon a tubular shaft 77, the inner or right-hand end whereof is enlarged to form a shoulder or abutment 77ª and is journaled in the plate 12 and the outer end whereof is journaled in an angular bracket 78, having secured thereto immediately inwardly of its said outer end a ratchet-wheel 79. The hub 76 is provided with a pin 80, which passes through a longitudinal slot 81 into the bore of the tubular shaft 77, and the said hub and its gear are given a normal outward tendency by an expansible spiral spring 82 inside said shaft between the pin 80 and the plate 12, the position of the hub and gear being regulated by a screw 83, inserted in the outer end of the shaft 77 and bearing against the pin 80 to move it against the spring. By this arrangement, which is shown in detail in Fig. 15, the screw maintains the gear in mesh with the pinion 74, and when the screw is loosened or withdrawn the spring 82 throws the gear out of engagement with said pinion.

Near the base of the machine there projects outwardly from the left-hand plate 12 the bearing 84 of an armature-lever 85, pivoted at its lower end by a bolt 85ª, extending through the bearing 84, and the said lever carries upon its upper end a pivoted double pawl 86, the lower or operative end of which is maintained in engagement with the ratchet-wheel 79 by a spring 87, secured to the lever. The said lever is normally retracted to the approximately vertical position by a contractile spring 88, secured thereto and to a screw-post 88ª upon the plate 12, the said spring holding the lever against the adjustable screw-stop 89. The armature 90 of the armature-lever 85 is actuated at intervals by a pair of magnets 91 to rotate the ratchet-wheel the distance of one tooth, and with it the spur-gear 75, thereby through the pinion 74 turning the paper-feed roller a corresponding distance. The magnets 91 are mounted in a bracket 92 beneath the bracket 78, which supports the shaft 77 of the ratchet-wheel, and in the said bracket 78 is mounted a spring-pawl 93, which prevents backward rotation of the ratchet-wheel, and the said bracket 78 also, as shown in Fig. 4, supports the left-hand cam 59, which raises the paper-feed roller.

Just within the front of the machine there is mounted upon the outside of the left-hand plate 12 a vertical shaft 94, continuously rotated during the operation of the device by means of a suitable power (either independent of or directed from the motor which actuates the stylus-shaft) applied to the drum 95 of said shaft 94. Upon the top of the shaft is a bevel-gear 96, meshing with a similar gear 97 upon a horizontal shaft 98, which is mounted in brackets 99, 100, and 101 and which is formed in two sections connected by friction-clutch devices 102. This shaft carries upon its rear end a bevel-gear 103, which engages between the bevel-gears 104 and 105, which are secured to boxes 106 and 107, mounted upon an extension 108 of the worm-shaft 18, having its end bearing in the bracket 101, which said boxes are engaged by the sliding clutch member 109, mounted upon said extension or shaft and pivotally connected to the ends of an armature-lever 110, forming part of a set of three magnets 111, which are supported in a bracket 112 near the rear of the plate 12, the said armature-lever having its pivotal point in an angle-plate 113 above said bracket. According as a positive or negative current is sent through these magnets the armature-lever will throw the clutch member 109 into engagement with either the right-hand box 106 or the left-hand box 107, thereby communicating to the worm-shaft 18 a forward or reverse movement from the vertical shaft 94 through the intermediation of the sectional shaft 98 and the several gears. The polarity of the current is governed by a switch or current-changer 114, secured upon the upper edge of the right-hand plate 12 and shown in detail in Figs. 12, 13, and 14. This device embodies two sets or pairs of posts 115, in which are mounted thumb-screws 116, inserted in the outer sides of the said posts and extending through the same to form contact-points 116ª. Between the posts 115 are mounted bearing-lugs 117, in which are pivoted contact-levers 118, connected near the top by a bar 119. The contact-levers are operated in a swinging or rocking movement by a rod 120, extending longitudinally of the machine, having its left-hand end loosely or slidably mounted in the plate 12 and formed at its opposite end into a ring or eye 121, which surrounds a rubber sleeve or casing 122, secured upon the bar 119. At the outer end of the contact-changer is secured a fifth post 123, upon which is secured a plate-spring 124, to the free end of which is pivoted a pointed dog or pawl 125, which bears downwardly upon the upper face of the ring or eye 121, which is notched to receive it, and this pawl makes the movement of the contact-levers positive to insure contact and prevents the contact-levers from flying back when once mounted. Each of the posts 115 123 and the bearing-lugs 117 is insulated from the remainder of the mechanism by a rubber bushing 126, surrounding it and countersunk in the bed-plate of the device. Wires or conductors 127 and 128 are connected to diagonally opposite posts 115 and lead to a battery or source of electrical energy and to the magnets 111ª and 111ᵇ of the set of three, and wires 129 lead from the contact-levers 118 to the magnets 111ᶜ, as will be more fully hereinafter described when considering the circuits of my apparatus. It will readily be understood, however, that the swinging of the contact-levers will reverse the current to and change the polarity of the magnet 111ᶜ and of its armature-lever, and whenever the magnets 111ᵃ and 111ᵇ are energized it will be thrown to the opposite side of the set of magnets, thereby operating the clutch member 109 to correspondingly change the direction of travel of the worm-shaft 18. The actuating impulse to the magnets 111ᵃ and 111ᵇ is not simultaneous with the action of the contact-changer, but follows it later, as will hereinafter appear.

To the frame of the stylus-carrier or any convenient part thereof is secured an arm 130, formed into a loop 131 at the upper end and fitting in a central exterior annular groove 132 of a sleeve 133, which is mounted upon the longitudinal rod 120. Each end of this sleeve has formed therein a countersunk recess in which is inserted a rubber insulating and frictional ring 134, which engages the rod 120 and is secured in place by a nut or washer 135, screwed in the end of the sleeve to close the same, as best shown in the detail views in Figs. 19 and 20. The first movement of the stylus-carrier in either direction thus reverses the contacts, and the sleeve 133 then slides upon the longitudinal rod 120 as the stylus-carrier moves and operates frictionally to retard the movement thereof. I actuate the stylus-carrier intermittently to move longitudinally upon the shaft 13 through the agency of the worm-shaft 18. In the machine embodied in the drawings this movement occurs after each revolution of the shaft 13, during which the space occupied by four letters has been traversed by the styluses. Upon the said shaft 13 outside of the right-hand plate 12 I secure a rotary contact-commutator 136, the contact-strip 137 of which ranges axially thereof, and to the bracket 14 I secure brushes 138, suitably insulated therefrom and connected by wires 139 to a battery or other source of electrical energy and to a pair of magnets 140, mounted in the bracket 100, secured to the left-hand plate 12, the upper portion of which forms one of the bearings of the shaft 98. In an arm or extension 100ᵃ of this bracket is pivoted an armature-lever 141, the upper end of which moves inwardly or toward the plate 12 when attracted by the magnets 140. Immediately beneath the bracket 100 is a bracket 142, carrying an adjusting-screw 143, which bears against the inner face of the lower end of the armature-lever 141, passing through a hollow adjusting-screw 144, carrying at its end a short coiled spring 145, which bears against the outer face of said end of the armature-lever to govern its normal position, to act as a cushion against the movement of the same, and to restore it quickly to its normal position when the magnetizing impulse ceases. The portion or end of the bracket 142 through which the screw 144 passes is slit at 142ᵃ and provided with a set-screw 142ᵇ to bind the screw 144 in position when properly adjusted, and within the said screw is inserted an additional adjusting-screw 143, which serves as a stop to limit the inward movement of the attracted armature-lever and prevent its actually reaching the magnets and adhering thereto.

Upon the shaft 98 is mounted a cam or stop 146, cut out at either end to form lugs 146ᵃ, adapted to rest upon a pawl or dog 147, having a flat upper end to receive the lug and maintained normally in the vertical position by a coiled spring 148, surrounding and secured to the journal 149 of the said pawl 147 exteriorly of a nut 149ᵃ on said journal, which holds the same to the bracket 100, one end of the said spring being secured to a pin 148ᵃ on said bracket, whereby the spring imparts an inward tendency to the pawl 147, while fastening the same to the pin operates to limit the action of the spring and prevent the pawl from passing beyond the vertical position. Upon the rear side of the upright pawl 147 is mounted a smaller pawl 150, pivoted through its center, with its lower end resting upon a stud 151 on the upright pawl 147 and held against the same by a small spring 152, secured to the upright pawl 147 above the said pawl 150. The upper end of the pawl 150 projects into the path of movement of the outer end of the cam or stop 146, and the said end of the cam is provided with a laterally-projecting pin 153, which strikes the pawl 150 in the movement of the cam. The shaft 98 rotates constantly during the operation of the machine, and as its rear section is held immovable by the cam 146 the motion of the shaft ends at the friction-clutch. At each revolution of the stylus-shaft 13, however, the magnets 140 will be energized, attracting the armature-lever 141, and this striking the lower end of the pawl 150, which is held against yielding by the stud 151, will throw the upright pawl 147 outwardly, releasing the cam 146 and permitting the rear section of the shaft 98 to turn a semirevolution, thereby actuating the worm-shaft 18 to shift the stylus-carrier a certain distance in a direction dependent upon the position of the clutch of the bevel-gears. The armature-lever 141 in throwing the upright pawl 147 passes the lower end of the pawl 150, permitting the pawl 147 to instantly return to place, and as the outer end of the cam descends the pin 153 thereon will strike the upper end of the pawl 150 and raise its lower end to permit the armature-lever 141 to be restored to its retracted position by the spring 145.

At intervals during the operation of the transmitting or recording machine I start and stop them in unison. As shown, this is effected at each revolution of the shaft 13 and at the same time that the stylus-carrier is being advanced by the worm-shaft 18. Upon the said shaft 13, adjacent to the commutator thereon, I secure a cam or stop 154, the end whereof is cut out to form a lug 155. In front of and beneath the shaft is an angle-plate 158, in which is pivoted the lower end of an armature-lever 149, which extends upwardly in front of the cam 154 and is held retracted by a spring 160. In front of the armature-lever is a pair of magnets 161, supported in a bracket 162 and connected together by a plate 163. Centrally of this plate is secured a forwardly-projecting pin 164 the free end of which is screw-threaded and inserted loosely through a post 165, secured to the plate 12, a nut 166 being secured upon said threaded end and the said pin being surrounded by a spiral spring 167 between the post and the plate 163. The magnets are slidably mounted in the bracket 162 and may by this spring and nut be adjusted relatively to the armature-lever 159. In an extension 162$^a$ of the said bracket in which the free end of the armature-lever plays are inserted thumb-screws 168, provided with jam-nuts 169 and which act as stops to limit the movement of the armature-lever in either direction. Upon the rear edge of the armature-lever is formed a shoulder 170, the top of which is in the path of the cam 154 when the armature-lever is retracted and the rear edge of which is curved to permit the cam to disengage from said shoulder when the armature-lever moves forwardly. In this shoulder 170 and in an eye 171 upon the armature-lever is slidably mounted a vertical rod 172, which rests upon and is secured to an angular spring-strip 173, fastened to the front of the armature-lever and projecting through a slot therein. This strip normally raises the rod 172 to project it slightly above the shoulder 170 and is provided upon its free end with an upwardly-projecting contact point or stud 174, which normally contacts with an angle-plate 175, secured to the rear edge of the armature-lever. The rod 172 is sectioned and intervened by a joint 176, of rubber, which insulates its ends. The attached ends of the strip 173 and of the angle-plate 175 are connected by wires 177 to contact-screws 178, insulated from the plate 158, whence the wires lead to the magnets 161. As the shaft revolves the cam at each revolution strikes the shoulder 170 of the armature-lever and stops the shaft. The rod 172, however, is depressed by the cam, thereby breaking contact between the stud 174 and the angle-plate 175, whereupon, as will hereinafter be seen when considering the circuits, the magnets 161 will be energized, thus attracting the armature and releasing the cam, permitting the shaft again to revolve.

Both the transmitting and recording machines are substantial duplicates one of the other, and in the drawings, except in the diagram illustrating the circuits, I have not shown a separate view of the recorder. I may here state that the recording-styluses would need some slight modification if intended for mechanical writing—as, for instance, the reproduction of a message by marking through carbon-paper upon a message-blank beneath—and so far as shown herein my invention is used in connection with a chemically-prepared paper in which the markings are made by electrolytic action as the current passes through the recording-stylus. I contemplate, however, the employment of any desired writing mechanism upon the recording instrument, whether mechanical, electrochemical, or photochemical, and my invention is not limited in this regard.

To the frame of the stylus-carrier of each machine I secure a hard-rubber plate 179, to which is secured a cable of two wires in the case of the recording-machine and three in the case of the transmitter. The wires 180 are connected to brushes 181 upon either side of the stylus-carrier and bearing, respectively, against the collars thereof. The third wire 182 of the transmitter connects to an additional brush 183, mounted upon the face of the stylus-carrier and contacting with the foil-paper. Upon the shaft 13 of the transmitter I secure a commutator 184 with two brushes 185, secured with suitable insulation to the bracket 14, adjacent thereto, and these brushes connect by wires 186 respectively to one of the stylus-wires 180 and to one of the pressure-roller levers 52.

I have thus far described the actual mechanism of my invention and have defined the specific operation of such details or features thereof as was necessary to an understanding of the construction of the instrument or machine under analysis. I will now proceed to describe the circuits or system of my invention and the mode of operation thereof.

The transmitting and recorder machines are each actuated by motors the power of which is applied to their gears 15, and these motors are run at the same speed, as nearly as this can be governed by mechanical means. The wires 180, connecting to the transmitting-stylus carrier, lead to batteries A and B, conveniently located, and are connected therebetween by juncture to the main line 187, which leads to the recording-machine and through it to the ground. The wire 188, connected to the pressure-roller of the paper-feed, leads to the ground. When there is electrical connection between the two brushes 183 through their styluses and the foil-paper or message-blank, a local short circuit is established which includes the batteries A and B. When none of the right-hand styluses is in contact with the foil-paper, or, again, when none of the left-hand styluses is in contact therewith, the short circuit is broken, and the battery of the opposite styluses, which are still on foil-paper, contact is included in the main-line circuit, commencing from the ground, through the paper-feed pressure-roller, through foil-paper and the said still-contacting styluses, through the line 187, to the recording-machine, and there to ground. When all of the styluses of both sets are out of contact with the foil-paper, there is no current sent over the line except as hereinafter described. By reason of the fact that the styluses are separated into right and left hand sets, elecrically disconnected, the two styluses in contact at any instant operate independently. The batteries A and B present opposite poles to the line 187, the battery A having its positive pole connected to the line and the battery B having its negative pole so connected. Thus these batteries, while of the same polarity in the local short circuit, are of opposite polarity with respect to the line and their respective styluses, and hence when a left-hand stylus alone is on foil-paper a positive current is sent over the line, and when a right-hand stylus alone is on foil-paper a negative current is sent over the line, and as either of these actions takes place coincidently with the opposite stylus striking insulating-ink it will be noted that the impulse which records the fragmentary particle of writing touched by the stylus comes from the battery of the opposite polarity thereto and which intervenes the opposite stylus and the line. Following up the line 187 and assuming a right-hand stylus to be transmitting a point of the insulating-ink constituting the message whereby a positive impulse from the left-hand battery A is sent over the line the current travels first to the magnets 161, which release the stop mechanism of the transmitter, immediately beyond which is a heavy battery C, included in the line and communicating by the wires 177 to the contacts 173 and 175 of the stop mechanism. The machine being in operation and the contacts in engagement, the battery C is short-circuited over these wires and the positive writing impulse passes onto a neutral relay-magnet 189, the armature 190 of which is held on a blank contact 191 by the spring 192 and which the magnet when energized by the writing impulse tends to attract to a contact 193. The armature, however, is connected to a dash-pot 194, the piston of which is pivoted to said armature and which retards the action of the armature to such an extent that the short writing impulse will not actuate this relay. The current thus proceeds through the line to the recording-machine, where it first meets a polarized relay 195. The stylus-carrier revolves in a plane perpendicular to the message-sheet, and by reason of the arrangement of the position of the styluses one revolution of the stylus-carrier will cause the styluses to contact in the aggregate with that area of insulated ink which defines four letters or characters, though I may of course vary the number of letters transmitted at each revolution by altering the arrangement of parts. As the stylus-carrier is cylindrical, but two of the styluses (one of each side or set) will be at any time in contact with the message-blank which is mounted upon the cylindrical paper-feed roller, and since the styluses are arranged around the stylus-carrier in a spiral form two styluses will never come in contact with the same particle of insulated ink. The first magnet 196 of the polarized relay is preceded by a small positive battery D of weak current, which is connected to the magnet 196 by the main line and to first contact 196$^a$ of said relay by a wire 197. The second magnet 198 is followed in the line by a similarly small or weak negative battery E, which is connected to the second contact 198$^a$ by a wire 199. The polarized armature 200, mounted between the magnets, carries branch wires 201, which are connected to the line respectively between the battery D and its magnet 196 and between the magnet 198 and the battery E, the said wires being connected to and insulated from the contact-points of the end of the armature, so as to short-circuit either of the batteries and its magnet. The line 187 continues across the magnets 196 and 198. As the writing impulse or current which we are considering is a positive one, it will merely augment manifold the power of the positive battery D and attract the armature 200, which short-circuits the battery D. The current or impulse then follows the line 187 to the neutral relay 189 of the recorder, which it is of too short duration to actuate, then passes the short circuit of the magnet 161, which as the machine is running is closed, then through the neutral relay-magnet 202, which it actuates or keeps actuated to attract its spring-retracted armature 203 upon its effective contact 204 to close one end of a short circuit formed by the wire 205, which leads to the paper-feed-roller wires 186 of the recorder and by the wire 206, which leads to the armature of two current-reversing relays 207 and 208, which are included in the line-circuit and communicate with the recorder-styluses. The armature 209 of the first of these relays 207 is connected, through its contact 210 and a wire 211, to the stylus-wires 180 of the recorder, which said wires lead to the positive poles of batteries F and G, the negative poles of which are connected to the wire 205. The wire 206 ends at the second relay 208 and is connected to the first relay 207 by a short wire 212. A spring 213 holds the armature 209 against its contact 210, and therefore a closed short circuit is normally maintained around the battery F through the wire 211, contact 210, armature 209, wire 206, contact 204 of the relay 202, armature 203 thereof, and wire 205 to battery. The armature 214 of the second relay 208 is retracted against its contact 215 by a spring 216. This contact is connected by a wire 217 to the left-hand stylus-wire 180 of the recorder, and when the armature is on the contact a short circuit is established around battery G, through wire 217, contact 215, armature 214, wire 206, contact 204, armature 203, and wire 205 to battery. As both batteries present their negative poles to the wire 205, this double short circuit which includes both batteries, maintains perfectly. The line 187 continues across the magnets of the relay 207, thence to the relay 208, across its magnets through to the ground. The relays 207 and 208, being polarized relays, embody magnets of opposite winding, and these are connected to the line to present opposite polarities to said line, whereby a current of positive polarity will open one of these relays, and a current of negative polarity will open the other against their normally closing springs. In the construction shown in the drawings the first relay 207 is negative, and therefore the positive writing impulse opens this relay, leaving the positive relay 208 closed. This opening of the relay breaks the short circuit of the battery F (though without disturbing the battery G) and sends the current of the said battery F through that one of the right-hand styluses which is then contacting with the message-blank and causes it to make a minute mark upon the said blank corresponding to the fragmentary particle of insulating-ink which the transmitter-stylus covered or traversed in producing or instituting the impulse. The positive writing impulse after closing the positive portion of the relay comprising the magnets 196 and 198 is diminished in pressure by the amount of the small or weak negative battery E, which is without operative effect upon the said writing impulse, and when the impulse ceases this small negative current passes over the line to the relay 202, then to the relays 207 and 208, and through them to the ground. It is of just sufficient strength to energize the relay-magnet 202 and keep its armature attracted, it being remembered that the said relay is neutral and capable of being actuated by either a positive or negative current. The small negative current will not, however, affect either of the polarized relays 207 and 208. This negative current, moreover, in effect clears the line of the positive impulse, and besides making easier the passage of the negative writing impulse, which will generally follow, it also serves to separate any two positive impulses which may occur in succession. As there are simultaneously in contact with the message-blank one right-hand stylus and one left-hand, it may be expected that the next impulse will be due to the right-hand stylus striking insulating-ink, which will send a negative current by breaking the short circuit of the battery B, which will cause a negative writing impulse from said battery to pass over the line. The action and path of the impulse are substantially the same as just described with the exception that the relay-armature 200 is thrown to contact 198$^a$, short-circuiting the negative battery E and permitting the weak positive current of the battery D to pass over the line with and after the end of the negative writing impulse, and with the further exception that the relay 207 remains closed and the relay 208 is opened, thus breaking the short circuit of battery G and causing one of the left-hand styluses to write. It frequently happens that both styluses are on insulating-ink at once. In fact, this may occur proportionately considerably during the operation. In such cases the line-circuit is broken at the styluses and no connection exists to the foil-paper and the ground. Therefore no current can pass over the line. Thereupon the relay-magnet 202, being no longer energized, permits its armature 203 to fly back to a blank contact or stop 204$^a$ under the action of its spring 203$^a$, and the double short circuit of the batteries F and G being broken at this common point both said batteries will discharge to their respective styluses, and consequently both styluses will write simultaneously. If both styluses are on foil-paper at once, the complete short circuit through both batteries A and B to their respective transmitter-styluses and from one to the other of these through the foil-paper will prevent any writing current from being sent over the line; but, the line being unbroken, the weak current from the one of the batteries D and E keeps the no-current relay 202 actuated, and neither of the recorder-styluses will unite. When the stylus-carrier has made one revolution and its thirty-two styluses have transmitted four letters or have traversed a space equal to that occupied by four letters in the message, the cam-stop 154 of the shaft 13 of each machine strikes the shoulder of the armature-lever 159 and stops said shaft. At the same time the brushes 138 strike the contact-strip 137 of the commutator or rotary contact-maker 136. These brushes are connected to wires 139, which lead to the magnets 140, a battery H being located in each circuit. The completion of these circuits at each revolution of the two shafts 13 energizes the magnets 140, attracting their armature-levers 141, and releases the cams in the manner previously described, thereby permitting the rear section of the shaft 98 of each machine to make a semirevolution, actuating the worm-shaft 18 through the bevel-gears 103, 104, and 105, whereby the said worm-shaft shifts each of the stylus-carriers longitudinally a distance equal to the space of four letters. Besides shifting the stylus-carriers I thus stop the machines at each revolution, so as to bring them absolutely to the same point on restarting. One machine may travel slightly faster than the other; but under properly-arranged conditions the slight amount of variation in the time taken to write four letters will not be perceptible in the message when the letters are transmitted in the manner forming part of my invention, as hereinabove described. As the cams or stops 154 strike the shoulders of their armature-levers, however, they break the contact of the two contact-strips 173 175 and cause the current of each battery C to pass over the line, thereby energizing the magnets 161, attracting the armature-levers and releasing the shafts 13, which thereupon proceed in their revolution, and at the same time the spring contact-strips 173 175 again close the short-circuits of the respective batteries C, which do not further affect or interfere with the line, and the direction of the passage of the current over the line has not been sufficiently long to affect the relays 189, which have the retarding dash-pots connected thereto. The writing proceeds, with intermittent stopping, shifting, and starting of the stylus-carriers, until one line of the message has been transmitted. At the end of the line of the message, immediately beneath the same, there is made an extended mark of insulating-ink, as shown in Fig. 21. This may either be done by hand or it may be accomplished by the type-writing machine which originally writes the message. It will doubtless be found most advantageous to write the message directly upon the message-sheet by a special or adapted type-writer in which the roller is provided with pins like the paper-feed roller of my invention, so as to write the characters and the lines in insulating-ink exactly the right size and distance apart and in which one key will make the marking at the end of each line, or, again, the original message may be photographed or reproduced upon the message-blank, if desired, and the marks supplied either before or after reproducing. As the machine writes the last four or lesser number of letters at the end of the line the extra brush 183 of the transmitter passes over the insulated marking. This brush is comprised in a separate circuit formed by the wire 182, leading to a battery I, thence to a relay 220, and thence to the wire 188 of the transmitter paper-feed roller, the circuit being completed through the foil-paper. The armature 221 of this relay is normally spring-retracted to its effective contact 222, which connects by a wire 223 to the battery C of the stop-releasing magnet 161, and the armature 221 of the said relay is also connected to said battery by a wire 223ª. During the writing operation, while the brush 183 is on foil-paper, the relay 220 is energized and the short circuit of the wire 223 is kept open, as the armature 221 is held against its blank contact or stop 224. When the brush 183 strikes insulating-ink, however, its circuit is broken. The armature 221 flies back to the contact 222 and completes the short-circuit 223, so that when the machines come to a stop the magnets 161 will not be energized to release them until the brush 183 shall strike foil-paper again. At the same time the "prolonged-current" relays 189 are actuated to attract their armatures 190 against the retarding action of their springs and their dash-pots, and these armatures engage each its effective contact 193. This contact is connected to a wire 225, leading to a battery J, thence to the magnet 111ᵇ, across to the magnet 111ª, and thence to one of the magnets 91. The armature of the prolonged-current relay 189 is connected to a wire 226, which leads to others of the magnets 91. To the wire 225 at either side of the battery J are connected the branch wires 127 128, which lead from the diagonally opposite contact-screws of the contact-changer 114 and from them to the magnet 111ᶜ. Thus when the prolonged-current relay 189 closes the circuit of wires 225 and 226 either a positive or negative current flows through said circuit to the magnet 111ᵇ and 111ᶜ. The contact-levers 118 having been shifted by the longitudinal rod 120 by the travel of the stylus-carrier, so as to make contact between the right-hand contact-screws, a different polarity has been given the magnet 111ᶜ, and when the prolonged-current relay closes the circuit 225 226 and energizes the magnets 111ª 111ᵇ this actuates the armature-lever 110 to shift the clutch member to engage the box of the right-hand bevel-gear 104; whereby the direction of travel of the worm-shaft 18 is changed so that when the next semiturn is given said worm-shaft by the shaft 98 it will shift the stylus-carrier to the left instead of the right, and the shifting will continue in this direction until another line has been written, whereupon the next impulse of the battery J will again change the direction of the longitudinal travel of the stylus-carrier, it being understood that in traveling to the left the carrier has shifted the longitudinal rod 120 and the contact-levers 118 to contact the left-hand contacts, and this alternate longitudinal movement of the stylus-carrier, which is of course similarly and simultaneously effected in each machine, continues from line to line until the message has been fully sent. It must be noted that the insulated-ink markings hitherto referred to are at opposite ends of the successive lines or beneath the end which is last touched by the styluses, and such ends of the line of travel of the stylus-carrier may be fixed by the insulated markings at any points in the line as required or permitted by the arrangement of the message. As the wires 225 and 226 terminate at the magnets 91, these are also energized to attract the armature-levers 85 and through the agency of the double pawl thereby to turn the ratchet-wheel 79 one tooth, and thereby, through the gears 75, move the paper-feed roller a distance equal to the space between the successive lines of the message, so that a new line of writing is presented to the line of travel of the styluses. This advance of the message removes the insulated marking away from the brush 183, whereupon the circuit of its wires 182 through the foil-paper is completed, the magnet 220 is energized, and the armature 221 attracted to its blank contact, opening the short circuit of the battery C and causing it to energize the stop-releasing magnets, thus starting both machines in motion. When the machines have stopped, the arrangement is such that the stylus-carrier will present to the message-blank the longitudinal space between the two ends of the spiral series of styluses, and none of the styluses will be in contact with the message-blank, which might send current when the stylus-carrier is being shifted and also allows the stylus-carrier a sufficient time to advance the space of four letterrs. In order that the short circuit of the batteries A and B may not be opened or the line broken to cause the "no-current" reply-relay 202 to make both styluses write, I have, as hereinbefore described, electrically connected the casing-strip which holds the left-hand styluses to an insulated contact 38 or portion of the right-hand cap or rim of the stylus-carrier, so that the circuit will continue through the two brushes 181 of the transmitter. In this position of the machine the brushes 185 make contact with and are connected by the commutator 184, and as these brushes connect, respectively, to the pressure-roller lever 65 and to the stylus-wire 180 the current will be complete, it being of course understood that as the recorder-styluses are not in the line-circuit it is unbroken at the recording end.

In the diagrammatic view Fig. 22 of the recorder and in the detail views Figs. 17 and 17ᵃ I have shown a means of governing the action of the recorder-stylus shaft, with the object and effect of keeping the recorder-machine in unison with the transmitter. Upon the shaft 13 I form an extension 230, which projects beyond the left-hand plate 12, and to this plate is secured a hollow cylindrical pole-piece 231, the ends of which are closed by hard-rubber heads or disks 232, one of which lies against and is secured to the plate 12, and the shaft extension 230 is journaled in bushings 233, secured centrally in the said head. The cylinder 231 is formed of separate longitudinal strips 234, secured by screw 235 to the rubber head 232. These strips are equal in number to the number of styluses in each series, and there are therefore sixteen of them in the construction on my invention shown in the drawings. The strips are each of a width equal to approximately the height of the letter or line to be transmitted. Within the cylinder is a hard-rubber spool 236, in which the shaft extension 230 rotates, the heads of the spool being immovable in the said cylinder. Around the spool is wound the wire coil 237, which connects by wires 238 to a neutral relay 239, said wires being connected to the armature 240 and the effective contact 241 thereof and one of the wires being intervented by a small battery K. The magnet of the relay connects by wires 242 to the main line or ground-wire thereof, so that whenever a writing impulse is sent over the line, whether it be positive or negative, the relay will attract its armature and close the circuit 238 and energize the coil 237. Upon the shaft extension are secured armatures or fingers 243, which are tapered or beveled to an edge. By means of this device whenever a writing impulse is sent over the line the armatures or fingers 243 will be attracted by the longitudinal strip 234, to which they point or to which they are nearest adjacent. Assuming that the armatures point to one edge of the strip 234 and that in the direction of rotation of the shaft the armatures will travel across the strip to the opposite edge thereof, it will be manifest that if both machines are traveling in unison the armatures will reach the farthest edge of the strip in the same time as a transmitter-stylus carrier is turned an equal distance and the contacting styluses thereof have passed over a fragment of the insulating-ink corresponding in area to the height of the letter and to the width of the stylus-point. This is in practice the duration of each writing impulse. If the recorder-stylus shaft is traveling slightly faster than the transmitter-stylus shaft, the edge of the strip 234, which is being traversed by the armature, will be reached before the writing impulse has ceased. As the strip, however, attracts the armatures, they will not be allowed to pass or leave this edge of the strip, but will be held thereto, thus confining the writing of the recorder-stylus to the same space or area as is traversed by the transmitter-stylus during the same period, it being manifest that if the recorder-stylus carrier were to travel faster than the transmitter-stylus carrier it would make the recorder line of writing slightly zigzag. When the writing impulse ceases, the relay 239 will open and the recorder-stylus shaft will travel without the retarding action. The spaces between the strips 234 are equal to the spaces between the styluses of each spiral series, and if the machines are running in perfect unison at the commencement of the first writing impulse the armatures will point to the first edge of the following strip 234; but if the recorder-stylus shaft is still traveling faster the armatures will have passed this first edge and the attracting-strip will similarly again retard the travel of the shaft. If, on the contrary, the recorder-stylus shaft is traveling more slowly than the transmitter-stylus shaft, the action of this device will be different. Assuming the armature to point to the first edge of the strip 234 at the commencement of the writing impulse, if the recorder-stylus shaft travels more slowly than the transmitter-stylus shaft the armatures will not reach the farther edge of the strip 234 by the time the writing impulse has ceased. This, however, will not interfere with the recording of the message, as the recorded stroke will simply be a fraction shorter. When the writing impulse ceases, the armature will travel past the edge of the strip and into the space between the strips, but will not reach the next strip. Then when another writing impulse follows and the armatures are energized they will be attracted to the next strip or to the one to which they are nearest adjacent, and the difference of travel of the two stylus-shafts will be compensated, and this action will continue, so that the recorder-stylus shaft will be thus intermittently advanced to keep in unison with the transmitter-stylus shaft. By this means while I do not employ synchronism I obtain equally good results and such as will be sufficient in a device embodying my invention to keep the machine in unison.

At suitable points in the several circuits I have shown rheostats 244, which serve merely to vary the resistance as desired and do not alter the operation as described.

In adjusting the message-sheet the gear 75 is slid outwardly upon its tubular shaft 77 by loosening the screw 83, thereby releasing the paper-feed roller from the rotary action of said gear, and the cams 59 are actuated to let the said roller fall, so that the message can be inserted, and in the case of the transmitter-sheet or foil-paper care is taken that the circumferential pins thereof project through the perforations in the paper.

From the foregoing description it will be seen that my machines transmit and write the message in specific or practically isolated successive portions of a transverse line which when recorded are written completely and not partially in indistinguishable fragments, the carriers being shifted one space at the end of each such specific portions, which eliminates a part of the space to be traversed by the styluses and lets the machines start anew in unison, and that the paper is advanced one line at the end of the transmission of each previous line, thereby by this feature alone saving the traversing by the styluses of about one-half of the space of the whole message or making a complete saving of sixty per cent. of the message, which represents a gain in time of this proportion less the time which may be taken for the carrier-shifting and paper advancement, and by reversing the direction of longitudinal travel of the carriers no time is lost in shifting the carriers back to a common point of starting.

It is an important feature of my invention that the successively-transmitted sections are divided into minute fragments by the styluses and transmitted by the rapid revolution of the stylus-carrier thereover, and a considerable speed of transmission is attained by this method, while the accuracy of transmission is not impaired by such slight lack of synchronism between the machines as might exist during the short space of time in which each specific isolated or self-distinguishable section of the message is transmitted when they are each time started in unison.

The operation of the invention will be readily understood from the foregoing description, taken in connection with the accompanying drawings, and the advantages of the system and apparatus will be manifest to all who are conversant with the art of telegraphy, and particularly the branch of automatic and facsimile telegraphy.

It is to be especially understood that I do not confine myself to the use of the exact construction and details of mechanism set out, as the essence of my invention may be embodied in various or modified mechanical forms other than or different from the particular arrangement of the apparatus shown.

Having thus fully described my invention, what I claim as new, and desire to secure by Letters Patent, is—

1. A facsimile-telegraph comprising means for holding a message-sheet, a plurality of styluses arranged to travel in a straight line over a single individual and legibly separate line of the message, means for causing successive lines of the message to be intermittently presented to and to be traversed by the said styluses, and means for connecting the said styluses to a single line-wire.

2. A facsimile-telegraph comprising means for holding a message-sheet, a plurality of styluses, means for causing the styluses to travel over a portion of a line of the message in a direction at right angles to the direction of the line, and means for causing the styluses to travel over successive portions of the line.

3. A facsimile-telegraph, comprising means for holding a message-sheet, a plurality of styluses, means for causing the styluses to travel over a specific portion of a line of a message, and means for shifting the styluses at intermittent intervals a distance approximately equal to the length of the specific portion traversed.

4. A facsimile-telegraph comprising means for holding a message-sheet, a plurality of styluses, means for causing the styluses to travel over a portion of a line of the message in a direction at an angle to the direction of the line and a spiral course over the said portion of the line, and means for causing the styluses to travel over successive portions of the line.

5. A facsimile-telegraph, comprising means for holding a message-sheet, a plurality of styluses arranged to travel transversely over a single line of the message, means for causing successive lines of the message to be traversed by the said styluses, and means for connecting the said styluses to a single line-wire.

6. A facsimile-telegraph, comprising means for holding a message-sheet, a plurality of styluses arranged to travel transversely over a single line of the message, means for causing successive lines of the message to be traversed by the said styluses, and means for causing the styluses to travel in opposite directions over the alternate lines.

7. A facsimile-telegraph, comprising means for holding a message-sheet, a plurality of styluses arranged to travel over a specific legibly-separate area or self-distinguishable portion of the message longitudinally of the message-sheet and at an angle to the transverse direction of the message across the message-blank, and means for causing the styluses to move transversely of the message-sheet to cover successive portions of the message.

8. A facsimile-telegraph, comprising means for holding a message-sheet, a plurality of styluses arranged to travel over a specific legibly-separate area or self-distinguishable portion of the message and at an angle to the transverse direction of the message across the message-blank, and means for moving the styluses to successive portions of the message and for causing the styluses to travel over such portions at separated intervals.

9. A facsimile-telegraph, comprising means for holding a message-sheet a plurality of styluses arranged to travel in a path longitudinally of the message-sheet over a certain specific legibly-separate area or self-distinguishable portion and at an angle to the transverse direction of the message across the message-blank, means for causing the said styluses to travel over similar portions of the message transversely thereof, and means for presenting successive portions of the message to the styluses.

10. A facsimile-telegraph, comprising means for holding a message-sheet, a plurality of styluses arranged to travel transversely over a single line of the message; means for causing the said styluses to transmit a specific legibly-separate area or self-distinguishable portion of the said line, means for stopping the said styluses and shifting them to successive portions of the said line and means for presenting successive lines of the message to said styluses.

11. A facsimile-telegraph, comprising means for holding a message-sheet, a plurality of styluses arranged to travel longitudinally of the message-sheet over a certain specific legibly-separate area or self-distinguishable portion of the message to transmit the same, means for stopping the said styluses and shifting them transversely to the next following successive portion of the same line, and means for advancing the message-sheet successive spaces of one line each to present successive lines of the message to the styluses.

12. A facsimile-telegraph, comprising means for holding a message-sheet, a plurality of styluses arranged in circular series; means for causing said styluses to travel in a vertical plane over the message-sheet to successively contact with fragmentary particles of the message, means for causing the styluses to travel in a spiral course over a line of the message and means for moving the styluses to successive portions of the message.

13. A facsimile-telegraph comprising means for holding a message-sheet, a plurality of styluses arranged in a circular series; means for causing said styluses to travel in a vertical plane over the message-sheet at an angle to the direction of the line to successively contact with fragmentary particles of the message and means for moving the styluses to successive portions of the message.

14. A facsimile-telegraph comprising means for holding a message-sheet, a plurality of styluses arranged in a circular series; means for causing said styluses to travel in a vertical plane over the message-sheet at an angle to the direction of the line to successively contact with fragmentary particles of the message, means for causing the styluses to travel in a spiral course over a line of the message and means for moving the styluses to successive portions of the message.

15. A facsimile-telegraph, comprising means for holding a message-sheet, a plurality of styluses arranged in circular series; means for causing the said styluses to travel in a vertical plane longitudinally of the message-sheet to transmit a certain specific legibly-separate area or self-distinguishable portion of the message, means for causing the styluses to travel transversely over a single line of the message to transmit successive portions of the same, and means for causing successive lines of the message to be traversed by said styluses.

16. A facsimile-telegraph, comprising means for holding a message-sheet, a plurality of styluses arranged in circular series; means for causing said styluses to travel in a vertical plane whereby successively to contact with the message-sheet, means for moving said styluses over a single line of the message, means for causing successive lines of the message to be traversed by said styluses, and means for causing the styluses to travel in opposite directions over the alternate lines.

17. A facsimile-telegraph, comprising means for holding a message-sheet, and a rotary stylus-carrier, a plurality of styluses mounted upon the said stylus-carrier in a substantially spiral series; means for causing said stylus-carrier to rotate in a vertical plane relatively to the message-sheet whereby the styluses will successively contact therewith at different portions of the sheet to transmit a certain specific legibly-separate area or self-distinguishable portion of the message, means for shifting the said stylus-carrier whereby the styluses will rotate over successive portions of the same line of the message, means for presenting successive lines of the message to the said styluses.

18. A facsimile-telegraph, comprising means for holding a message-sheet, and a rotary stylus-carrier, a plurality of styluses mounted upon the said stylus-carrier; means for causing said stylus-carrier to rotate in a vertical plane respectively to the message-sheet whereby the styluses will successively contact therewith at different portions of the sheet to transmit a certain specific legibly-separate area or self-distinguishable portion of the message; means for shifting the said stylus-carrier whereby the styluses will rotate over successive portions of the same line of the message and means for presenting successive lines of the message to the said styluses.

19. In a facsimile-telegraph comprising means for holding a message-sheet, and a rotary stylus-carrier, a plurality of styluses mounted upon the said stylus-carrier in a substantially spiral series; means for causing said stylus-carrier to rotate in a vertical plane respectively to the message-sheet whereby the styluses will successively contact therewith at different portions of the sheet to transmit a portion of the message, means for operating the said stylus-carrier whereby the styluses will rotate over successive portions of the same line of the message; and means for presenting successive lines of the message to the said styluses.

20. A facsimile-telegraph, comprising means for holding a message-sheet, a rotary stylus-carrier, means for rotating the same in a vertical plane relatively to the message-sheet, a plurality of styluses arranged in a substantially spiral series around the said carrier, means for shifting the said carrier to successive portions of the message, and means for stopping and starting said carrier when thus shifting the same.

21. A facsimile-telegraph comprising a message-sheet, a rotary stylus-carrier; means for rotating the same in a vertical plane relatively to the message-sheet; and a plurality of styluses arranged in a substantially spiral series around the said carrier.

22. A facsimile-telegraph comprising means for holding a message-sheet, a rotary stylus-carrier provided with a plurality of styluses traveling in a vertical plane relatively to the message-sheet, means for shifting the said stylus-carrier transversely of the message-sheet to transmit successive portions of the same line, and means for advancing the message-sheet the successive spaces of one line.

23. A facsimile-telegraph, comprising means for holding a message-sheet, a rotary stylus-carrier provided with a plurality of styluses traveling in a vertical plane relatively to the message-sheet, means for operating the said stylus-carrier transversely in a specific direction of the message-sheet to transmit successive portions of the same line, and means for advancing the message-sheet the successive spaces of one line.

24. A facsimile-telegraph, comprising means for holding a message-sheet, a rotary stylus-carrier provided with a plurality of styluses traveling in a vertical plane relatively to the message-sheet, means for shifting the said stylus-carrier transversely of the message-sheet to transmit successive portions of the same line, means for causing the stylus-carrier to travel in a reverse direction over each alternate line, and means for actuating the paper-advancing means and the stylus-carrier-reversing means simultaneously.

25. A facsimile-telegraph, comprising means for holding a message-sheet, a rotary stylus-carrier, means for causing said carrier to rotate in a vertical plane relatively to the message-sheet, a plurality of electrically-separated circular series of styluses upon the said stylus-carrier, whereby a plurality of styluses will be simultaneously in contact with the message-sheet; and means for connecting the said plurality of series of styluses to a single line-wire.

26. A facsimile-telegraph comprising means for holding a message-sheet, a rotary stylus-carrier provided with styluses extending around the same and traveling in a vertical plane with respect to the message-sheet, means for rotating said stylus-carrier in a constant plane spirally of the transverse course or direction of the messages, means for shifting the said stylus-carrier to successive portions of the message, and means for changing the direction of the shifting means.

27. In a facsimile-telegraph, comprising means for holding a message-sheet, a rotary stylus-carrier provided with styluses extending around the same and traveling in a vertical plane with respect to the message-sheet, means for rotating said stylus-carrier in a constant plane, spirally of the transverse course or direction of the messages; and means for operating the said stylus-carrier to traverse successive portions of the message.

28. A facsimile-telegraph, comprising means for holding a message-sheet, a rotary stylus-carrier provided with a plurality of styluses arranged around the same and traveling in a vertical plane with respect to the message-sheet, means for rotating the stylus-carrier, means for stopping and starting the stylus-carrier at intervals, and means for shifting the stylus-carrier to successive portions of the message when the carrier is stopped.

29. A facsimile-telegraph, comprising means for holding a message-sheet, a rotary stylus-carrier provided with styluses extending around the same and traveling in a vertical plane relatively to the message-sheet, means for rotating the said stylus-carrier; means for stopping the carrier at intervals, means actuated by the stopping means for starting and stopping the carrier, and means for shifting the carrier to successive portions of the message.

30. A facsimile-telegraph, comprising means for holding a message-sheet, a rotary stylus-carrier provided with styluses extending around the same and traveling in a vertical plane relatively to the message-sheet, means for rotating the said stylus-carrier in constant plane, means for stopping and starting the same at each revolution thereof; means for shifting the said carrier to successive portions of the message after each revolution; means for changing the direction of the shifting means and means for advancing the message-sheet the successive space of one line at each change of direction of the shifting means of the carrier.

31. In a facsimile-telegraph, a rotary stylus-carrier adapted to be operated in a vertical plane, two series of styluses extending around said stylus-carrier in a substantially spiral arrangement, each series being electrically separated from the other, electrical connections from each of the series of styluses to a single line-wire, and means for separating the impulses of said styluses.

32. In a facsimile-telegraph, a rotary stylus-carrier adapted to be operated in a vertical plane, two series of styluses extending around said stylus-carrier, each series being electrically separated from the other, electrical connections from each of the series of styluses to a single line-wire, and means for separating the impulses of said styluses.

33. In a facsimile-telegraph, a rotary transmitting stylus-carrier comprising two insulated sections, and two series of transmitting-styluses mounted respectively upon said sections, and means for sending separate impulses from the styluses of each series.

34. In a facsimile-telegraph, a rotary stylus-carrier comprising a block of insulated material, metallic sections secured upon said block and mutually disconnected, and two series of styluses mounted in a substantially spiral arrangement respectively upon said sections, whereby they will range parallel one with the other.

35. In a facsimile-telegraph, a rotary stylus-carrier comprising a block of insulated material, a metallic casing surrounding the same and divided into electrically-separated sections, and two series of styluses connected respectively with the said sections and projecting radially of the stylus-carrier, the inner ends of the said styluses being inserted in the insulated block.

36. In a facsimile-telegraph, the combination with a main rotary shaft and a worm-shaft, of the revoluble stylus-carrier having its frame mounted upon the said worm-shaft and its body portion slidably mounted upon the main shaft of a tube extending across the frame, a pair of nuts mounted in the ends of the said tube and engaging the worm-shaft and means for adjusting the said nuts and for securing the tube to the frame.

37. In a facsimile-telegraph, the combination with a rotary shaft, of a stylus-carrier mounted thereon and consisting of an insulating-block, spirally cut out upon its periphery, a sectional metallic casing secured upon the said block, styluses mounted in the said sectional casing, and in the said block and projecting radially, caps or collars mounted upon each end of the insulating-block and connected thereto and to the sectional casing, and electrically separate from the rotary shaft, and brushes at either side of the carrier bearing respectively upon the end caps or collars.

38. In a facsimile-telegraph, a rotary stylus-carrier comprising a block of insulating material, a metallic casing surrounding the same and divided into electrically-separate sections formed with a spiral slot between them, plates secured to the said casing at either side of the slot, and two series of styluses mounted in the said plates, and projecting radially of the stylus-carrier.

39. In a facsimile-telegraph, a rotary stylus-carrier comprising a block of insulating material, a metallic casing surrounding the same and divided into electrically-separate sections formed with a spiral slot between them, plates secured to the said casing at either side of the slot, and two series of styluses mounted in the said plates, and projecting radially of the stylus-carrier; the inner ends of the said styluses being yieldingly and slidably mounted in the insulating-block.

40. In a facsimile-telegraph, the combination with a main rotary shaft and a parallel worm-shaft, of a stylus-carrier, comprising a frame mounted upon the worm-shaft and provided with adjustable nuts and working upon the said worm-shaft; means for adjusting the position of the stylus-carrier upon the worm, and a rotary body portion mounted upon the rotary shaft and slidable thereon, the said rotary body portion being provided with circular series of styluses mounted therein.

41. In a facsimile-telegraph, the combination with a rotary stylus-carrier and means for actuating the same, of a message-paperfeed roller mounted in vertical alinement with the stylus-carrier, spring-actuated pressure-rollers bearing against either side of the feed-roller, means for moving the feed-roller in a vertical path away from the stylus-carrier, means for limiting the movement of the pressure-rollers when the feed-roller is withdrawn, and means for throwing the feed-roller back to position and sustaining it.

42. In a facsimile-telegraph, the combination with a rotary stylus-carrier and means for actuating the same, of a message-paper-feed roller mounted in relation to the said stylus-carrier, pressure-rollers bearing against either side of the same, adjustable cams above the feed-roller to limit its upward movement, and operating-cams below the said roller for raising and lowering the same.

43. In a facsimile-telegraph, the combination with a rotary stylus-carrier and means for actuating the same, of a message-paper-feed roller mounted in relation to the said stylus-carrier, and intermittent means for turning the said roller to advance the message-paper the distance of one line after the stylus-carrier has traversed one line of the message.

44. In a facsimile-telegraph, the combination with a rotary stylus-carrier and means for actuating the same, of a message-paper-feed roller, and means actuated by the stylus-carrier to the end of each line for turning the feed-roller to advance the message-sheet the distance of one line after the stylus-carrier has traversed one line of the message.

45. In a facsimile-telegraph, the combination with a rotary stylus-carrier and means for actuating the same, of a message-paper-feed roller, and electrically-actuated means actuated by the stylus-carrier at the end of each line for turning the feed-roller to advance the message-sheet the distance of one line after the stylus-carrier has traversed one line of the message.

46. In a facsimile-telegraph, the combination with a rotary stylus-carrier and means for actuating the same, of a message-paper-feed roller, and electrically-actuated means actuated by the stylus-carrier for turning the feed-roller to advance the message-sheet the distance of one line after the stylus-carrier has traversed one line of the message.

47. In a facsimile-telegraph the combination with a rotary stylus-carrier and means for actuating the same of a message-paper-feed roller, means for moving the stylus-carrier longitudinally of the said roller, and means for turning the said roller to advance the message-sheet the distance of one line, said means being actuated by the stylus-carrier at the end of its travel over each line of the message.

48. In a facsimile-telegraph, the combination with a rotary stylus-carrier and means for actuating the same, of a message-paper-feed roller mounted in relation thereto, means for raising and lowering the said feed-roller, means for intermittently turning the same; means for throwing the turning devices out of connection therewith to prevent rotation thereof and permit of its raising and lowering.

49. In a facsimile-telegraph, the combination with a rotary stylus-carrier, and means for actuating the same, of a message-paper-feed roller mounted in relation to said stylus-carrier, means for raising and lowering the same, a gear carried by one end of the roller, a gear in connection therewith to rotate the same; means actuated by the stylus-carrier for operating the latter gear at the end of each line of the message, and means for throwing the said gear out of engagement with the gear on the feed-roller.

50. In a facsimile-telegraph, the combination with a rotary stylus-carrier, and means for actuating the same, of a message-paper-feed roller, mounted beneath the stylus-carrier, pressure-rollers at either side thereof, means for raising and lowering the said feed-roller; means for turning the same, means whereby the stylus-carrier intermittently actuates the turning devices, spring-operated means for throwing the said turning devices out of connection with the feed-roller, and means for holding the said devices in connection therewith against the spring.

51. In a facsimile-telegraph, the combination with a rotary stylus-carrier, and means for actuating the same, of a message-paper-feed roller mounted beneath the same, pressure-rollers at either side thereof, means for raising and lowering the said feed-roller, a gear carried by the said feed-roller, a slidable gear adapted to engage therewith to turn the roller, a hollow shaft on which the latter gear is slidably mounted, a spring tending to slide the said gear normally out of engagement with the gear of the feed-roller, and a screw adapted to press the slide of the said gear into engagement against the spring.

52. In a facsimile-telegraph, the combination with a rotary stylus-carrier, and means for actuating the same, of a message-paper-feed roller mounted beneath the said stylus-carrier and adapted to raise and lower the same adjustable cams above the said roller for limiting its upward movement, operating-cams below the said roller for raising and lowering the same and to maintain it in the raised position, spring-actuated pressure-rollers at either side of the paper-feed roller, means for limiting the inward movement of the said pressure-rollers when the feed-roller is lowered, a gear upon the end of the feed-roller, a gear mounted in engagement with the same, a hollow slotted shaft on which the said gear is slidably mounted, the said gear being provided with a pin which projects through the slot of the shaft a spring within the shaft tending to throw the gear normally out of engagement with the gear of the feed-roller, and a screw mounted in the hollow shaft and bearing against the pin to slide the gear into engagement against the spring.

53. In a facsimile-telegraph, the combination with a rotary stylus-carrier, and a shaft for actuating the same of means in connection with the said shaft for shifting the stylus-carrier longitudinally thereof intermittently.

54. In a facsimile-telegraph, the combination with a rotary shaft, and a stylus-carrier mounted thereon, to rotate therewith and longitudinally movable thereupon of means in connection with the said shaft for stopping the same intermittently, and means upon and in connection with the said shaft for shifting the said stylus-carrier longitudinally thereof intermittently.

55. In a facsimile-telegraph, the combination with a rotary shaft, and a stylus-carrier mounted thereon to rotate therewith and longitudinally movable thereupon of means upon and in connection with the said shaft for stopping the same intermittently; means for shifting the stylus-carrier longitudinally thereof intermittently, and means actuated by the stop devices for releasing the shaft.

56. In a facsimile-telegraph the combination with a rotary shaft and a stylus-carrier mounted thereon to rotate therewith and longitudinally movable thereupon, of means upon and in connection with the said shaft for stopping the same intermittently; means upon and in connection with the said shaft for shifting the said stylus-carrier longitudinally thereof intermittently, means for reversing the direction of movement of the stylus-carrier, and means carried by the stylus-carrier for actuating the reversing means at the end of each line of travel of the said carrier.

57. In a facsimile-telegraph, the combination with a rotary shaft, and a stylus-carrier mounted thereon to rotate therewith and longitudinally movable thereupon, of means upon and in connection with the said shaft for stopping the same intermittently, means upon and in connection with the said shaft for shifting the stylus-carrier longitudinally thereof intermittently; means for reversing the direction of movement of the stylus-carrier; means carried by the stylus-carrier for actuating the reversing means at the end of each line of travel of the said carrier, means for supporting a message-sheet in relation to the stylus-carrier, means for advancing the message-sheet successive distances of one line and means whereby the said message-sheet-advancing means will be actuated at the end of each line of travel of the stylus-carrier.

58. In a facsimile-telegraph, the combination with a rotary shaft, and a stylus-carrier mounted thereon to rotate therewith and longitudinally movable thereupon, of stop devices upon the said shaft, a magnet mounted adjacent thereto, an armature-lever mounted in connection with the magnet and comprising means for engaging the stop device of the shaft, and means for energizing the said magnet to attract the armature-lever and release the shaft.

59. In a facsimile-telegraph, the combination with a rotary shaft, and a stylus-carrier mounted thereon to rotate therewith and longitudinally movable thereupon, of stop devices upon the said shaft; a magnet mounted adjacent thereto, an armature-lever mounted in connection with the magnet and comprising means for engaging the stop device of the shaft, and means upon and in connection with the armature-lever whereby the contact of the stop device of the shaft therewith will initiate the energizing on the magnet to attract the said armature-lever and release the shaft.

60. In a facsimile-telegraph, the combination with a rotary shaft, and a stylus-carrier mounted thereon to rotate therewith and longitudinally movable thereupon, of stop devices upon the said shaft, a magnet mounted adjacent thereto, an armature-lever mounted in connection with the magnet and comprising means for engaging the stop device of the shaft, a sliding contact device mounted upon the armature-lever and adapted to be moved by the stop device of the shaft; a second contact device upon the said lever which the sliding contact normally engages, a circuit including the said contacts and adapted to energize the magnet when the contacts are disengaged, whereby the movement of the sliding contact will initiate the energizing of the said magnet to attract the armature-lever and release the shaft.

61. In a facsimile-telegraph, the combination with a rotary shaft and a stylus-carrier mounted thereon, of a stop device carried by the said shaft, a magnet mounted adjacent thereto, an armature-lever mounted in relation to the said magnet and provided with a shoulder, means for normally retracting the armature-lever to bring the shoulder into the path of movement of the stop device of the shaft, normally engaging contacts upon the said armature-lever adapted to be disconnected by the engagement of the stop device with the shoulder thereof, a circuit including the said contacts and a source of electrical energy which is short-circuited when the contacts engage, and means whereby when the short circuit is broken the current thereof will energize the magnet to attract the armature and withdraw its shoulder from the stop device.

62. In a facsimile-telegraph the combination with a main rotary shaft and a stylus-carrier mounted thereon and longitudinally movable thereupon of a shifting-shaft connected with the stylus-carrier and adapted to move the same longitudinally of its shaft, rotary means for actuating the shifting-shaft and means for permitting the same intermittently to actuate the shifting-shaft.

63. In a facsimile-telegraph, the combination with a main rotary shaft and a stylus-carrier mounted thereon and longitudinally movable thereupon, of a shifting-shaft connected with the stylus-carrier and adapted to move the same longitudinally of its shaft, rotary means for actuating the shifting-shaft, and means actuated by the stylus-shaft for permitting the same intermittently to actuate the shifting-shaft.

64. In a facsimile-telegraph, the combination with a main rotary shaft and a stylus-carrier mounted thereon and longitudinally movable thereupon, of a shifting-shaft connected with the stylus-carrier and adapted to move the same longitudinally of its shaft, means in connection therewith for communicating rotary motion to the shifting-shaft intermittently, electromagnetic devices for operating the intermittent devices and means for causing the said electromagnetic devices to act at each specific number of revolutions of the stylus-shaft.

65. In a facsimile-telegraph, the combination with a main rotary shaft and a stylus-carrier mounted thereon and longitudinally movable thereupon, of a shifting-shaft for moving the stylus-carrier upon its shaft, a sectional rotary shaft geared to the said shifting-shaft, and means for connecting and disconnecting the sections of the shaft to cause the same intermittently to actuate the shifting-shaft.

66. In a facsimile-telegraph, the combination with a main rotary shaft and a stylus-carrier mounted thereon and longitudinally movable thereupon, of a shifting-shaft for moving the said stylus-carrier upon its shaft, a sectional rotary shaft geared to the said shifting-shaft, a friction-clutch connecting the said sections, and stop devices upon one of the sections, stop devices mounted adjacent thereto to engage the same to stop the said sectional shaft, and means for intermittently releasing the said section.

67. In a facsimile-telegraph, the combination with a main rotary shaft and a stylus-carrier mounted thereon and longitudinally movable thereupon, of a shifting-shaft connected with the stylus-carrier and adapted to move the same longitudinally of its shaft, a rotary shaft geared thereto, and means for reversing the gear connections of the rotary shaft and the shifting-shaft whereby the stylus-carrier may be moved in opposite directions.

68. In a facsimile-telegraph, the combination with a main rotary shaft and a stylus-carrier mounted thereon and longitudinally movable thereupon of a shifting-shaft connected with the stylus-carrier and adapted to move the same upon its shaft, a sectional rotary shaft geared to the said shifting-shaft, a friction-clutch connecting the sections stop devices upon one of the said sections, stop devices mounted adjacent thereto, a magnet mounted in relation thereto, an armature-lever adapted when attracted by the said magnet to disengage the stop devices and permit partial revolution of the rotary shaft-section, and means operated by the stylus-shaft for energizing the said magnet.

69. In a facsimile-telegraph, the combination with a main rotary shaft and a stylus-carrier mounted thereon and longitudinally movable thereupon, of a shifting-shaft connected with the stylus-carrier and adapted to move the same longitudinally of its shaft, and means governed by the stylus-shaft for actuating the said connecting means intermittently at a specific number of revolutions of the said shaft.

70. In a facsimile-telegraph, the combination with a main rotary shaft and a stylus-carrier mounted thereon and longitudinally movable thereupon, of the shifting-shaft connected to the said stylus-carrier to move the same upon its shaft, a sectional rotary shaft geared in connection with the said shifting-shaft, a friction-clutch connecting the sections, stop devices upon one of the said sections, a pawl adapted to engage the same, a magnet mounted adjacent thereto, an armature-lever adapted when attracted to move the pawl and release the stop devices to permit partial revolution of the said shaft-section, a circuit including the said magnets, brushes mounted adjacent to the stylus-shaft, and means upon the stylus-shaft for connecting the said brushes at each specific number of revolutions thereof whereby to energize the magnets.

71. In a facsimile-telegraph, the combination with a main rotary shaft and a stylus-carrier mounted thereon and longitudinally movable thereupon, of a shifting-shaft connected to the said stylus-carrier to move the same upon its shaft, a sectional rotary shaft geared in connection with the said shifting-shaft a friction-clutch connecting the sections, stop devices upon one of the said sections, a pawl adapted to engage the same, a magnet mounted adjacent thereto, an armature-lever adapted when attracted to move the pawl and release the stop devices to permit partial revolution of the said shaft-section, a circuit including the said magnet, brushes mounted adjacent to the stylus-shaft means upon the stylus-shaft for connecting the said brushes at each specific number of revolutions thereof whereby to energize the magnet, means for reversing the gear connections of the rotary shaft and the shifting-shaft, an electromagnetic device for actuating the said reversing means and devices operated by the stylus-carrier for energizing the said electromagnetic devices.

72. In a facsimile-telegraph, the combination with a rotary stylus-carrier, of a message-paper-feed roller and a shaft with which it is adapted to turn, insulated heads in the said roller connecting the same with the shaft, an adjusting-nut mounted upon the shaft to tighten the roller thereon, and gear connections for turning the said roller which are adapted to be disconnected to permit adjustment thereof.

73. In a facsimile-telegraph, the combination with a rotary shaft and a stylus-carrier mounted thereon and longitudinally movable thereupon, of a worm-shaft ranging parallel with the stylus-shaft and connected with the stylus-carrier to move the same longitudinally, gears carried by the worm-shaft, rotary means for actuating the said gears, clutch devices for alternately connecting the gears to the worm-shaft; and electromagnetic means for actuating the said clutch devices.

74. In a facsimile-telegraph, the combination with a shaft and a stylus-carrier mounted thereon and longitudinally movable thereupon, of a shifting-shaft connected with the stylus-carrier to move the same upon its shaft; devices for reversing the action of the shifting-shaft, said devices being comprised in an electric circuit, and means for changing the polarity of the said circuit.

75. In a facsimile-telegraph, the combination with a shaft and a stylus-carrier mounted thereon and longitudinally movable thereupon, of a shifting-shaft connected with the stylus-carrier to move the same upon its shaft; devices for reversing the action of the shifting-shaft, said devices being comprised in a circuit, and means actuated by the stylus-carrier for changing the polarity of the circuit at the end of each line of travel of the stylus-carrier.

76. In a facsimile-telegraph, the combination with a rotary shaft and a stylus-carrier mounted thereon to rotate therewith and longitudinally movable thereupon, of means upon and in connection with the said shaft for stopping the same intermittently, means upon and in connection with the said shaft for shifting the said stylus-carrier longitudinally thereof intermittently, means comprised in an electric circuit for reversing the direction of movement of the stylus-carrier, and means actuated by the stylus-carrier for changing the polarity of the circuit.

77. In a facsimile-telegraph, the combination with a rotary shaft and a stylus-carrier mounted thereon to rotate therewith and longitudinally movable thereupon, of means upon and in connection with the said shaft for stopping the same intermittently, means upon and in connection with the said shaft for shifting the said stylus-carrier longitudinally thereof intermittently; means comprised in an electric circuit for reversing the direction of movement of the stylus-carrier, a current-changer, a rod for actuating the current-changer, and means whereby the movement of the stylus-carrier actuates said rod.

78. In a facsimile-telegraph the combination with a rotary shaft and a stylus-carrier mounted thereon to rotate therewith and longitudinally movable thereupon, of means upon and in connection with the said shaft for stopping the same intermittently, means upon and in connection with the said shaft for shifting the said stylus-carrier longitudinally thereof intermittently, and means for reversing the direction of movement of the stylus-carrier, said means including magnets comprised in an electric circuit, an armature-lever connected with one of the magnets and means for changing the polarity of the armature-lever.

79. In a facsimile-telegraph the combination with a rotary shaft and a stylus-carrier mounted thereon to rotate therewith and longitudinally movable thereupon, of means upon and in connection with the said shaft for stopping the same intermittently, means upon and in connection with the said shaft for shifting the said stylus-carrier longitudinally thereof intermittently, means for reversing the direction of movement of the stylus-carrier and means including magnets comprised in an electric circuit, an armature-lever connected with one of the magnets and means for changing the polarity of the circuit, a current-changer included in the circuit and adapted to change the polarity of the current to the armature-lever and means controlled by the stylus-carrier for actuating the current-changer.

80. In a facsimile-telegraph the combination with a main rotary shaft and a stylus-carrier mounted thereon and longitudinally movable thereupon, of a shifting-shaft connected with the stylus-carrier and adapted to move the same longitudinally of its shaft, means controlled by the stylus-shaft for actuating the shifting-shaft intermittently, devices upon and in connection with the shifting-shaft for reversing the same, magnets comprised in an electric circuit, an armature connected to one of the magnets and to the shaft-reversing means, a current-changer included in the circuit, and means controlled by the stylus-carrier for actuating the current-changer to change the polarity of the armature-lever.

81. In a facsimile-telegraph, the combination with a main rotary shaft and a stylus-carrier mounted thereon and longitudinally movable thereupon, of a shifting-shaft connected with the stylus-carrier and adapted to move the same longitudinally of its shaft, means controlled by the stylus-shaft for actuating the shifting-shaft intermittently, devices upon and in connection with the shifting-shaft for reversing the same, magnets comprised in an electric circuit, an armature-lever connected to one of the magnets and to the shaft-reversing means, a current-changer included in the said circuit and comprising adjustable contacts, and contact devices mounted upon the same, a rod connected with the said contact devices, and means controlled by the stylus-carrier for shifting the said rod whereby the current-changer will change the polarity of the armature-lever.

82. In a facsimile-telegraph, the combination with a rotary shaft and a stylus-carrier mounted thereon to rotate therewith and longitudinally movable thereupon, of means upon and in connection with the said shaft for stopping the same intermittently; means upon and in connection with the said shaft for shifting the said stylus-carrier longitudinally thereof intermittently; means for reversing the direction of movement of the stylus-carrier, said means being comprised in an electric circuit and including a current-changer; a rod mounted adjacent to the stylus-carrier; a friction-sleeve upon the said rod, and connections from the stylus-carrier to the said friction-sleeve.

83. In a facsimile-telegraph, the combination with a main rotary shaft and a stylus-carrier mounted thereon and longitudinally movable thereupon, of a shifting-shaft connected with the stylus-carrier and adapted to move the same longitudinally of its shaft, means actuated by the stylus-shaft for causing the intermittent devices to act; devices upon and in connection with the shifting-shaft for reversing the same; magnets comprised in an electric circuit; an armature-lever connected to one of the magnets and to the shaft-reversing means; a current-changer included in the circuit devices and adapted to bring them in connection with the adjustable contacts; means bearing upon the said contact devices for governing the action thereof; a friction-sleeve mounted upon the said rod; and an arm upon the stylus-carrier connected with the said friction-sleeve.

84. In a facsimile-telegraph, the combination with a stylus-carrier and means for actuating the same, of a message-paper-feed roller; means comprised in an electric circuit for turning the said feed-roller specific distances, and means controlled by the stylus-carrier for closing the said circuit to operate the turning means.

85. In a facsimile-telegraph, the combination with a stylus-carrier and means for actuating the same, of a message-paper-feed roller, means comprised in an electric circuit for turning the said feed-roller specific distances, and means controlled by the stylus-carrier for closing the said circuit at the end of each line of travel of the stylus-carrier.

86. In a facsimile-telegraph, the combination with a stylus-carrier and means for actuating the same, of a message-paper-feed roller, means comprised in an electric circuit for turning the same specific distances, and means connected with the stylus-carrier and adapted to close the said circuit by contacting with markings upon the message-paper.

87. In a facsimile-telegraph, the combination with a stylus-carrier and means for actuating the same, of a message-paper-feed roller, means comprised in an electric circuit for turning the same specific distances, a brush connected with the stylus-carrier and adapted to close said circuit by contacting with markings upon the message-paper, and a relay limiting the closing of the said contacting means, whereby the circuit will be closed only by contact thereof with a prolonged marking.

88. In a facsimile-telegraph, the combination with a stylus-carrier and means for actuating the same, of a message-paper-feed roller, a ratchet-wheel mounted in connection therewith, an armature-lever carrying means for turning the ratchet a specific number of teeth, magnets for actuating the said armature-lever, and means governed by the stylus-carrier for energizing said magnets.

89. In a facsimile-telegraph, the combination with a stylus-carrier and means for actuating the same, of a message-paper-feed roller, an armature-lever mounted in relation thereto; means upon and in connection with the said armature-lever and the said feed-roller, whereby the movement of the armature-lever will turn the roller, and electromagnetic means for actuating the said armature-lever.

90. In a facsimile-telegraph, the combination with a stylus-carrier and means for actuating the same, of a message-paper-feed roller; an armature-lever mounted in relation thereto, means upon and in connection with the said armature-lever and the said feed-roller, whereby the movement of the stylus-carrier will turn the roller, a magnet adapted to actuate the said armature-lever and comprised in an electric circuit, and means carried by the stylus-carrier for closing the said circuit.

91. In a facsimile-telegraph, the combination with a stylus-carrier and means for actuating the same, of a message-paper-feed roller, means comprised in an electric circuit for turning the said roller; means controlled by the stylus-carrier for closing the circuit; a relay governing the closing of said circuit, and means for retarding the action of the relay.

92. In a facsimile-telegraph, the combination with a stylus-carrier and means for actuating the same, of a message-paper-feed roller, gear connections upon the said roller, means for disconnecting the gears; a ratchet-wheel connected with said gears, an armature-lever provided with a pawl adapted to turn the said ratchet-wheel, and electromagnetic means for actuating the said armature-lever.

93. In a facsimile-telegraph, the combination with a stylus-carrier, means for moving the same, over a line of the message, and means for reversing the movement of the stylus-carrier, of a message-paper-feed roller, means for turning the same; means comprised in an electric circuit for actuating the stylus-carrier-reversing means, and means comprised in the said circuit for actuating the feed-roller-turning means.

94. In a facsimile-telegraph, the combination with a stylus-carrier, means for moving the same over a line of the message, and means for reversing the movement of the stylus-carrier of the message-paper-feed roller, means for turning the same; means comprised in an electric circuit for actuating the stylus-carrier-reversing means and means carried by the stylus-carrier for controlling the said circuit.

95. In a facsimile-telegraph, the combination with a rotary shaft a stylus-carrier mounted thereon, a shifting-shaft connected with the said stylus-carrier to move the same longitudinally, a message-paper-feed roller, and means for turning the same, of means upon and in connection with the stylus-shaft for stopping and starting the carrier at intervals, means upon and in connection with the said shaft for actuating the shifting-shaft at intervals; means comprised in an electric circuit for reversing the said shifting-shaft, means comprised in the said circuit for actuating the feed-roller-turning means, and means carried by the stylus-carrier for closing the said circuit.

96. In a facsimile-telegraph, transmitting-stylus devices separated in sets or series connected with sources of electrical energy of opposite polarity, recording-stylus devices similarly separated in sets or series, means for sending an impulse from one set of transmitting-styluses when the opposite styluses are in contact with message matter, and means for causing the said impulses to actuate recording-styluses corresponding in position to the contacting transmitting-styluses.

97. In a facsimile-telegraph, transmitting-stylus devices separated in sets or series of opposite polarity, recording-stylus devices similarly separated in sets or series, and means whereby the contacting transmitting-stylus will send to the corresponding recording-styluses an impulse initially of opposite polarity to the transmitting-stylus.

98. In a facsimile-telegraph, transmitting-stylus devices separated in sets or series connected with sources of electrical energy of opposite polarity; recording-stylus devices similarly separated in sets or series; means for sending an impulse from one set of transmitting-styluses when the opposite styluses are in contact with message matter, and devices of opposite polarity between the transmitter and recorder for conveying the transmitting impulse to the corresponding recording-stylus.

99. In a facsimile-telegraph, transmitting-stylus devices separated in sets or series connected with sources of electrical energy of opposite polarity; recording-stylus devices similarly separated in sets or series, means for sending impulses from one set of transmitting-styluses when the opposite styluses are in contact with message matter, means for causing the said impulse to actuate recording-styluses corresponding in position to the contacting transmitting-styluses, and means for sending an impulse to each contacting recording-stylus when both contacting transmitting-styluses are in contact with message matter.

100. In a facsimile-telegraph, transmitting and recording stylus devices included in local circuits, a main line connecting the same, means governed by the transmitting-styluses for sending impulses from their local circuits over the main line to the recording-stylus circuit, and means governed by the said writing impulses for actuating the local recording-circuit to operate the contacting recording-stylus.

101. In a facsimile-telegraph, transmitting and recording stylus devices included in local circuits, a main line connecting the same, means governed by the transmitting-styluses for sending impulses from their local circuit over the main line to the recording-stylus circuit, means governed by the said writing impulses for actuating the local recording-circuit to operate the contacting recording-stylus, and means included in the main line for maintaining a weak current over the line.

102. In a facsimile-telegraph, transmitting and recording stylus devices, each divided into two sets or series; a local circuit including the transmitting-styluses and including sources of electrical energy of opposite polarity; local circuits of opposite polarity including respectively the sets or series of recording-stylus devices, a main line connecting with the transmitter local circuit to receive impulses of opposite polarity therefrom, and devices in the main line connecting with the respective recorder-circuits to cause the same to actuate a contacting recording-stylus when the impulse initiated by the corresponding transmitting-stylus passes over the line.

103. In a facsimile-telegraph, transmitting and recording stylus devices, each divided into two sets or series; a local circuit including sources of electrical energy of opposite polarity; local circuits of opposite polarity including respectively the sets or series of recording-stylus devices, a main line connecting with the transmitting local circuit to receive impulses of opposite polarity therefrom, and relays of opposite polarity included in the main line and adapted to actuate respectively the recorder-circuits.

104. In a facsimile-telegraph, transmitting and recording stylus devices, each divided into two sets or series; a local circuit including the transmitting-styluses and including sources of electrical energy of opposite polarity; local circuits including respectively the sets or series of recording-stylus devices, a main line connecting with the transmitting local circuit to receive impulses of opposite polarity therefrom, means in the main line for actuating the recorder-circuits, and a relay connecting with the main line and adapted to actuate both recorder-circuits when no current passes over the line during the operation of the devices.

105. In a facsimile-telegraph, transmitting and recording stylus devices, each divided into two sets or series; a local circuit including the transmitting-styluses and including sources of electrical energy of opposite polarity; local circuits including respectively the sets or series of recording-stylus devices, a main line connecting with the transmitting local circuit to receive impulses of opposite polarity therefrom, a relay connecting with the main line and adapted to actuate both recorder-circuits when no current passes over the line during the operation of the device, and a relay included in the main line and adapted to maintain a constant weak current over the line between each writing impulse.

106. In a facsimile-telegraph, transmitting and recording stylus devices, each divided into two sets or series; a local circuit including sources of electrical energy of opposite polarity; local circuits including respectively the sets or series of recording-stylus devices, a main line connecting with the transmitting local circuit to receive impulses of opposite polarity therefrom, a relay connecting with the main line and adapted to actuate both recorder-circuits when no current passes over the line during the operation of the device, and a relay included in the main line and adapted to maintain a constant weak current over the line between each writing impulse, said relay being actuated by the writing impulses and comprising means whereby it will send over the line impulses of opposite polarity.

107. In a facsimile-telegraph, transmitting and recording stylus devices, each divided into two sets or series, a local circuit including the transmitting-stylus devices and including sources of electrical energy of opposite polarity; local circuits including the respective sets of the recording-stylus devices; means for short-circuiting one or both sets of the transmitting-styluses; a main line connecting the transmitting and recording circuits, relays of opposite polarity connected with the said main line and with the respective recorder-circuits and adapted to actuate the recorder-circuits to operate their stylus devices, and means for actuating both recorder-circuits when both of the transmitting-stylus devices are short-circuited.

108. In a facsimile-telegraph, transmitting and recording stylus devices, each divided into two sets or series, a local circuit including the transmitting-stylus devices and including sources of electrical energy of opposite polarity; local circuits including the respective sets of the recording-stylus devices; means for short-circuiting one or both of the transmitting-styluses; a main line connecting the transmitting and recording circuits, and relays of opposite polarity connected with the main line and with the respective recorder-circuits and adapted to actuate the recorder-circuits to operate their stylus devices.

109. In a facsimile-telegraph, transmitting and recording stylus devices, each divided into two sets or series, a local circuit including the transmitting-stylus devices and including sources of electrical energy of opposite polarity; local circuits including the respective sets of the recording-stylus devices; means for short-circuiting one or both of the transmitting-styluses; a main line connecting the transmitting and recording circuits, relays of opposite polarity connected with the main line and with the respective recorder-circuits and adapted to actuate the recorder-circuits to operate their stylus devices; and relay included in the main line and adapted to maintain a constant weak current over the line between each writing impulse.

110. In a facsimile-telegraph, transmitting and recording stylus devices, each divided into two sets or series, a local circuit including the transmitting-stylus devices and including sources of electrical energy of opposite polarity; local circuits including the respective sets of the recording-stylus devices; means for short-circuiting one or both of the transmitting-styluses; a main line connecting the transmitting and recording circuits, relays of opposite polarity connected with the main line and with the respective recorder-circuits and adapted to actuate the recorder-circuits to operate their stylus devices, and a neutral relay connected with the main line and adapted to actuate both the recorder-circuits when there is no current passing over the line.

111. In a facsimile-telegraph transmitting and recording stylus devices connected by suitable circuits and adapted to work in unison; message-paper-feed mechanism mounted in relation to each of the stylus devices; means comprised in an electric circuit for operating the message-paper-feed mechanism said circuits being connected to the main circuit which connects the transmitting and recording devices and relays connected with the main circuit and adapted to be actuated by writing impulses from the transmitting-styluses to operation of the message-paper-feed mechanism.

112. In a facsimile-telegraph, transmitting and recording stylus devices connected by suitable circuits and adapted to work in unison, message-paper-feed mechanism mounted in relation to each of the stylus devices; means comprised in an electric circuit for operating the message-paper-feed mechanism, said circuit being connected to the main circuit which connects the transmitting and recording devices, relays connected with the main circuit and adapted to be actuated by writing impulses from the transmitting-styluses to operate a message-paper-feed mechanism, means for retarding the action of the said relays, and means controlled by the transmitting-styluses for sending a prolonged impulse to actuate the said relays.

113. In a facsimile-telegraph, transmitting and recording stylus devices connected by a main line, means for actuating said styluses; devices for stopping the same, electromagnetic devices for releasing the said stylus devices, a short circuit connected with the said electromagnetic devices, and means actuated by the stopping devices for opening the said short circuit and energizing the said electromagnetic devices.

114. In a facsimile-telegraph transmitting and recording stylus devices connected by a main line; means for actuating the said styluses; devices for stopping the same, electromagnetic devices for releasing the said stylus devices, a short circuit connected with the said electromagnetic devices, means actuated by the stopping devices for opening the said short circuit and energizing the said electromagnetic devices, a second short circuit connected with the first and governed by a relay, and means controlled by the transmitting-stylus devices for opening the latter short circuit and for closing it at intervals.

115. A facsimile-telegraph, comprising rotary stylus-carriers, carrying respectively transmitting and recording styluses; means for actuating the same; message-paper-feed mechanism; means for advancing the same to present successive lines of the message; means for stopping and starting the devices in unison; means for actuating the stylus-carriers to travel over a line of the message; means comprised in an electric circuit for actuating the advancing means of the message-paper-feed mechanism; means for preventing the actuation of the starting devices and means carried by the transmitting-stylus carrier and whereby the feed-roller-turning devices will be actuated and whereby the said devices will be withheld from action during the turning of the message-paper-feed mechanism.

116. In a facsimile-telegraph, the combination with a stylus-carrier means for rotating the same, a message-paper-feed mechanism, means comprised in an electric circuit for operating the said feed mechanism, of a brush carried by the stylus-carrier and means whereby the circuit of the turning devices will be closed when the brush is in prolonged contact with matter upon the message-paper.

117. In a facsimile-telegraph, the combination with the stylus-carrier, means for rotating the same, a message-paper-feed mechanism, and means comprised in an electric circuit for operating the feed mechanism, of a brush carried by the stylus-carrier, means whereby the circuit of the turning devices will be closed when the brush is in prolonged contact with the matter upon the message-paper, and means comprised in the said circuit for reversing the movement of the stylus-carrier.

118. In a facsimile-telegraph, the combination with transmitting and recording stylus devices, and a main line connecting them, of governing devices in connection with one of the said stylus devices, comprising a plurality of strips or surfaces separated by spaces, and contact devices therefor, and means for passing the writing impulses through the said governing devices, whereby the amount of travel of the recording-stylus devices will be restricted to the width of one strip, the said strips being of a predetermined width corresponding to the predetermined length of continuous travel or successive strokes of the transmitting-stylus devices.

119. In a facsimile-telegraph, the combination with transmitting and recording stylus devices, of governing devices comprising one or more strips corresponding to one or more transmitting-styluses and of an individual predetermined width corresponding with the length of continuous travel or strokes of a stylus, and the said strip or strips being succeeded or followed each by a space corresponding to the extent of travel of the stylus devices during the intervals between message impulses.

120. In a facsimile-telegraph the combination with transmitting and recording stylus devices, rotary shafts on which they are mounted, and a main line connecting the devices of means upon the recording-shaft, governed by the writing impulses over the said line for causing the said shaft to travel specific distances each corresponding to the length of continuous travel or successive strokes of a transmitting-stylus during a writing impulse.

121. In a facsimile-telegraph the combination with transmitting and recording stylus devices, rotary shafts on which they are mounted, a main line connecting the devices, of magnetic devices in connection with the recorder-shaft comprising separate strips or surfaces energized by the writing impulses over the line and adapted when energized to prevent rotation of the recorder-shaft after it has rotated a specific distance during a writing impulse the width of the strip corresponding to the length of continuous travel or stroke of a stylus.

122. In a facsimile-telegraph the combination with transmitting and recording stylus devices, rotary shafts on which they are mounted, a main line connecting the devices of a cylinder comprising a plurality of strips and electromagnetic means upon the recorder-shaft adapted to be attracted by the said strips to prevent rotation of the shaft a distance greater than the width of a strip during a writing impulse, and means for energizing the same by a contacting impulse.

123. In a facsimile-telegraph the combination with transmitting and recording stylus devices, and a main line connecting the devices, of a device comprising a plurality of separated strips and electromagnetic means upon the recorder-shaft adapted to be attracted by the said strips to prevent rotation of the shaft a distance greater than the width of a strip during the writing impulse, and means for energizing the same by a contacting impulse.

124. In a facsimile-telegraph, the combination with transmitting and recording stylus devices, rotary shafts on which they are mounted, and a main line connecting the devices, of a cylinder comprising a plurality of strips, and magnetic armatures or fingers having tapered ends adapted to be attracted by the said strips to prevent the rotation of the shaft a distance greater than the width of a strip during a writing impulse.

125. In a facsimile-telegraph, the combination with transmitting and recording stylus devices, rotary shafts on which they are mounted, and a main line connecting the devices of a cylinder surrounding the recorder-stylus shaft and comprising a plurality of longitudinal strips proportioned in number to the styluses, an insulating-spool surrounding the recorder-shaft, wire coils upon the same, connections from the main line to the said coils whereby they are energized by a writing impulse, and tapered armatures or fingers mounted upon the recorder-shaft and adapted to be attracted by the strips to regulate the travel of the recorder-shaft during a writing impulse.

126. A facsimile-telegraph, comprising means for holding a message-sheet, a plurality of styluses arranged to travel transversely over a single line of the message, means for causing successive lines of the message to be traversed by the styluses, and means for causing the styluses to travel in opposite directions over the alternate lines, means comprised in a single electric circuit for actuating the means for presenting successive lines and the stylus-alternating means; and means controlled by the said styluses for governing the said circuit.

127. In a facsimile-telegraph, comprising means for holding a message-sheet, a plurality of styluses arranged in circular series; means for causing the styluses to travel in a vertical plane whereby successively to contact with the message-sheet, means for moving said styluses over a single line of the message, means for causing successive lines of the message to be traversed by said styluses, means for causing the styluses to travel in opposite directions over the alternate lines, means comprised in a single electric circuit for actuating the means for presenting successive lines and the stylus-alternating means, and means controlled by the said styluses for governing the said circuit.

128. In a facsimile-telegraph, a stylus-carrier means for actuating the same, means for stopping the same intermittently a magnet mounted adjacent said stopping devices, an armature-lever mounted in relation to the magnet and comprising means for engaging the stopping devices, and means upon and in connection with the armature-lever whereby the engagement of the stopping device will initiate the energizing of the magnet to attract the said armature-lever and release the stylus-carrier.

In testimony that I claim the foregoing as my invention I have signed my name, in presence of the subscribing witnesses, this 17th day of January, 1901.

EDWARD E. KLEINSCHMIDT.

Witnesses:
 FREDK. KLEINSCHMIDT,
 PERCY T. GRIFFITH.